(12) United States Patent
Li et al.

(10) Patent No.: US 10,540,377 B2
(45) Date of Patent: Jan. 21, 2020

(54) COMPUTER IMPLEMENTED SYSTEMS FOR AUTOMATIC HIERARCHY FOR LARGE SCALE TIME SERIES DATA SETS

(71) Applicant: SAS Institute Inc., Cary, NC (US)

(72) Inventors: Yue Li, Irvine, CA (US); Neha Bindumadhav Kulkarni, Pune (IN); Yung-Hsin Chien, Apex, NC (US); Sagar Arun Mainkar, Pune (IN); Bhupendra Suresh Bendale, Pune (IN)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/379,470

(22) Filed: Apr. 9, 2019

(65) Prior Publication Data

US 2019/0317952 A1 Oct. 17, 2019

(30) Foreign Application Priority Data

Apr. 17, 2018 (IN) .............................. 201811014612

(51) Int. Cl.
*G06F 16/00* (2019.01)
*G06F 16/28* (2019.01)
*G06F 16/22* (2019.01)

(52) U.S. Cl.
CPC ........ *G06F 16/287* (2019.01); *G06F 16/2246* (2019.01)

(58) Field of Classification Search
None
See application file for complete search history.

(56) References Cited

U.S. PATENT DOCUMENTS

| 2014/0019088 A1* | 1/2014 | Leonard | G06F 17/18 702/178 |
| 2014/0019448 A1* | 1/2014 | Leonard | G06F 17/18 707/736 |
| 2019/0156253 A1* | 5/2019 | Malyack | G06Q 10/04 |

OTHER PUBLICATIONS

Dormann et al., "Collinearity: a review of methods to deal with it and a simulation study evaluating their performance", Ecography vol. 36, 2013, pp. 27-46.

(Continued)

*Primary Examiner* — Bai D Vu
(74) *Attorney, Agent, or Firm* — Kilpatrick Townsend & Stockton LLP

(57) ABSTRACT

A hierarchical structure (e.g., a hierarchy) for use in hierarchical analysis (e.g., hierarchical forecasting) of timestamped data can be automatically generated. This automated approach to determining a hierarchical structure involves identifying attributes of the timestamped data, clustering the timestamped data to select attributes for the hierarchy, ordering the attributes to achieve a recommended hierarchical order, and optionally modifying the hierarchical order based on user input. Through the approach disclosed herein, a hierarchy can be generated that is designed to perform well under hierarchical models. This recommended hierarchy for use in hierarchical analysis may be agnostic to any planned hierarchy provided by or used by a user to otherwise interpret the timestamped data.

30 Claims, 22 Drawing Sheets

(56) References Cited

OTHER PUBLICATIONS

Genuer et al., "Variable selection using random forests", Pattern Recognition Letters, 31(14), 2010, pp. 2225-2236.
Hyndman et al., "Optimal combination forecasts for hierarchical time series", Department of Econometrics and Business Statistics, Monash University, VIC 3800, Australia., Sep. 10, 2010, 24 pages.
Rendle, "Factorization Machines", 2010 IEEE International Conference on Data Mining, 2010, pp. 995-1000.

* cited by examiner

| Data | Region | Non-Hierarchy 2002 | | User-Provided Hierarchy 2004 | | Automatically Generated Hierarchy 2006 | |
|---|---|---|---|---|---|---|---|
| | | MAPE | MSE | MAPE | MSE | MAPE | MSE |
| Pricedata | FIT | 0.0449736 | 544.12749203 | 0.0427139 | 516.78775284 | 0.0460602 | 561.3479847 |
| | FORECAST | 0.0778478 | 1876.6218973 | 0.0778478 | 1876.6218973 | 0.0753968 | 1741.731154 |
| Demodata1 | FIT | 0.3891632 | 186.077767465 | 0.3813548 | 182.31171086 | 0.3828007 | 190.74754286 |
| | FORECAST | 0.6795347 | 819.85791317 | 0.6794083 | 819.85750087 | 0.5810561 | 490.51752725 |
| Demodata2 | FIT | 0.6124145 | 285434144.784 | 0.6151940 | 28379038.427 | 0.5853675 | 273362705.187 |
| | FORECAST | 50.066798 | 57773704.722 | 50.812365 | 57835640.859 | 49.187621 | 58515384.244 |
| Demodata3 | FIT | 0.0720793 | 256649542.411 | 0.0377296 | 100063143.501 | 0.0377296 | 100063143.501 |
| | FORECAST | 0.1337932 | 113463283.73 | 0.1284340 | 117807157.95 | 0.1284340 | 117807157.95 |
| Demodata4 | FIT | 0.8448902 | 395.12191782 | 0.8332479 | 393.8082896 | 0.7583682 | 393.99890706 |
| | FORECAST | 1.0094350 | 932.38410167 | 1.0015088 | 929.9368289 | 0.9086619 | 1022.0176278 |
| Demodata5 | FIT | 0.6530373 | 2.5058848839 | 0.2095214 | 2.8386061743 | 0.2095214 | 2.8386061743 |
| | FORECAST | 0.2201522 | 5.5108829274 | 0.0666161 | 5.0880281341 | 0.0666161 | 5.0880281341 |
| Demodata6 | FIT | 0.3366745 | 0.0600269203 | 0.1642422 | 0.0640998549 | 0.1642216 | 0.0643185079 |
| | FORECAST | 0.3999226 | 1.3245141442 | 0.1963203 | 0.1400372741 | 0.1960306 | 0.1321597645 |

FIG. 20

| Data | Region | Non-Hierarchy 2102 | | User-Provided Hierarchy 2104 | | Automatically Generated Hierarchy 2106 | |
| --- | --- | --- | --- | --- | --- | --- | --- |
| | | MAPE | MSE | MAPE | MSE | MAPE | MSE |
| Pricedata | FIT | 0.0451309 | 525.3273825 | 0.0428633 | 498.93225667 | 0.0443613 | 509.21884164 |
| | FORECAST | 0.0771342 | 1841.808817 | 0.0771342 | 1841.808817 | 0.0749489 | 1682.1635387 |
| Demodata1 | FIT | 0.4115746 | 176.77533908 | 0.4071574 | 175.04441563 | 0.4024138 | 183.24448557 |
| | FORECAST | 0.6846049 | 758.35061009 | 0.6847202 | 758.33981167 | 0.5855338 | 461.74310517 |
| Demodata2 | FIT | 0.8267396 | 26186221.15 | 0.8147479 | 26170669.943 | 0.8177217 | 26090025.529 |
| | FORECAST | 50.733065 | 56320454.89 | 50.598414 | 56387783.579 | 50.565773 | 56265913.367 |
| Demodata3 | FIT | 0.0713420 | 25862430.626 | 0.0378110 | 10035278.048 | 0.0378110 | 10035278.048 |
| | FORECAST | 0.1335659 | 113844489.79 | 0.1281039 | 117689917.47 | 0.1281039 | 117689917.47 |
| Demodata4 | FIT | 0.8705965 | 353.96826721 | 0.7660078 | 351.96157909 | 0.7805458 | 343.72847299 |
| | FORECAST | 1.0159549 | 943.07882565 | 0.9451284 | 932.00813866 | 0.9122478 | 868.4590166 |
| Demodata5 | FIT | 0.6997003617 | 2.5459999748 | 0.2483657 | 2.529271163 | 0.2477083 | 2.5472062185 |
| | FORECAST | 0.2200511277 | 5.0491750533 | 0.0677643 | 5.819554556 | 0.0675722 | 5.8135275103 |
| Demodata6 | FIT | 0.3167431753 | 0.1260543414 | 0.1411177886 | 0.0633432898 | 0.03166706 | 0.0156835945 |
| | FORECAST | 0.3862719101 | 1.45871677778 | 0.1573020025 | 1.2309677354 | 0.04013000 | 0.0183588166 |

COMPUTER IMPLEMENTED SYSTEMS FOR AUTOMATIC HIERARCHY FOR LARGE SCALE TIME SERIES DATA SETS

CROSS REFERENCE TO RELATED APPLICATIONS

The present application claims the benefit, under 35 U.S.C. § 119, of Indian Provisional Application No. 201811014612 filed Apr. 17, 2018, which is hereby incorporated by reference in its entirety.

TECHNICAL FIELD

The present disclosure relates to analyzing timestamped data generally and more specifically to improving clustering of timestamped data, such as to perform hierarchical analysis with improved hierarchies to generate more accurate predictions, such as to generate more accurate predictions of component failures to prompt repair or replacement of such components before a failure occurs.

BACKGROUND

Timestamped data can provide important and useful information to organizations. Organizations can leverage timestamped data to obtain information needed to better serve their customers, to reduce waste, and to otherwise benefit the organization or other entities. Timestamped data can be modeled, forecast, mined, or otherwise processed to inform decision making.

In another example, manufactures can leverage timestamped data relating to critical equipment to make decisions about maintenance scheduling to avoid critical component failures.

In another example, railroad companies can leverage timestamped data of shipments between various regions around the country to make decisions about where to stock rail cars to better meet predicted demand and minimize shipping delays.

In another example, energy companies can monitor and analyze timestamped data in real-time related to performance of wind turbines to quickly detect and respond to critical anomalous behavior and to maintain high turbine performance over time.

In another example, hospitals can aggregate timestamped patient data across various departments to better predict patient outcome and quickly detect and respond to potential health issues.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a system, comprising: one or more data processors; and a non-transitory computer-readable storage medium containing instructions which, when executed on the one or more data processors, cause the one or more data processors to perform operations including: receiving timestamped data, wherein the timestamped data is associated with a set of attributes and a set of independent variables, wherein the set of attributes comprises one or more time-independent attributes, and wherein the set of independent variables comprises one or more independent variables; clustering the timestamped data into a set of clusters, wherein clustering the timestamped data comprises clustering based on patterns of the timestamped data and responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises modeling the selected attributes or comparing a first order of at least two of the selected attributes with a second order of the at least two of the selected attributes; generating a hierarchical structure using the ordered, selected attributes; and performing a hierarchical analysis using the received timestamped data and the generated hierarchical structure.

In some cases, the timestamped data is associated with an original hierarchical structure, and wherein the hierarchical structure is optimized for hierarchical analysis such that the hierarchical analysis, when performed using the generated hierarchical structure, is more accurate than a hierarchical analysis performed using the original hierarchical structure. In some cases, the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes. In some cases, comparing the first order with the second order comprises comparing hierarchical analysis results associated with the first order with hierarchical analysis results associated with the second order. In some cases, comparing the first order with the second order comprises comparing an approximation measurement of the first order with an approximation measurement of the second order, wherein the approximation measurement of the first order and the approximation measurement of the second order are obtainable without performing hierarchical analysis. In some cases, ordering the selected attributes comprises sequentially building an order of the selected attributes, and wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises comparing all permutations of orders of the selected attributes. In some cases, ordering the selected attributes comprises: determining a number of the selected attributes; comparing the number of the selected attributes to a threshold value; comparing all permutations of orders of the selected attributes if the number of selected attributes does not exceed the threshold value; and sequentially building an order of the selected attributes if the number of the selected attributes exceeds the threshold value, wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises receiving a user selection associated with the set of attributes and ordering the selected attributes using the user selection, wherein the user selection is indicative of a desired order for each of the set of attributes. In some cases, ordering the selected attributes comprises modeling the selected attributes, and wherein modeling the selected attributes comprises: determining a Bayesian criteria associated with each of the selected attributes by performing a linear regression using the selected attributes as independent variables; and ordering the selected attributes according to decreasing order of the Bayesian criteria associated with each of the selected attributes.

Embodiments of the present disclosure include a computer-implemented method, comprising: receiving timestamped data, wherein the timestamped data is associated with a set of attributes and a set of independent variables, wherein the set of attributes comprises one or more time-independent attributes, and wherein the set of independent variables comprises one or more independent variables; clustering the timestamped data into a set of clusters, wherein clustering the timestamped data comprises clustering based on patterns of the timestamped data and responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises modeling the selected attributes or comparing a first order of at least two of the selected attributes with a second order of the at least two of the selected attributes; generating a hierarchical structure using the ordered, selected attributes; and performing a hierarchical analysis using the received timestamped data and the generated hierarchical structure.

In some cases, the timestamped data is associated with an original hierarchical structure, and wherein the hierarchical structure is optimized for hierarchical analysis such that the hierarchical analysis, when performed using the generated hierarchical structure, is more accurate than a hierarchical analysis performed using the original hierarchical structure. In some cases, the method further comprises preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes. In some cases, comparing the first order with the second order comprises comparing hierarchical analysis results associated with the first order with hierarchical analysis results associated with the second order. In some cases, comparing the first order with the second order comprises comparing an approximation measurement of the first order with an approximation measurement of the second order, wherein the approximation measurement of the first order and the approximation measurement of the second order are obtainable without performing hierarchical analysis. In some cases, ordering the selected attributes comprises sequentially building an order of the selected attributes, and wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises comparing all permutations of orders of the selected attributes. In some cases ordering the selected attributes comprises: determining a number of the selected attributes; comparing the number of the selected attributes to a threshold value; comparing all permutations of orders of the selected attributes if the number of selected attributes does not exceed the threshold value; and sequentially building an order of the selected attributes if the number of the selected attributes exceeds the threshold value, wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises receiving a user selection associated with the set of attributes and ordering the selected attributes using the user selection, wherein the user selection is indicative of a desired order for each of the set of attributes. In some cases, ordering the selected attributes comprises modeling the selected attributes, and wherein modeling the selected attributes comprises: determining a Bayesian criteria associated with each of the selected attributes by performing a linear regression using the selected attributes as independent variables; and ordering the selected attributes according to decreasing order of the Bayesian criteria associated with each of the selected attributes.

Embodiments of the present disclosure include a computer-program product tangibly embodied in a non-transitory machine-readable storage medium, including instructions configured to cause a data processing apparatus to perform operations including: receiving timestamped data, wherein the timestamped data is associated with a set of attributes and a set of independent variables, wherein the set of attributes comprises one or more time-independent attributes, and wherein the set of independent variables comprises one or more independent variables; clustering the timestamped data into a set of clusters, wherein clustering the timestamped data comprises clustering based on patterns of the timestamped data and responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises modeling the selected attributes or comparing a first order of at least two of the selected attributes with a second order of the at least two of the selected attributes; generating a hierarchical structure using the ordered, selected attributes; and performing a hierarchical analysis using the received timestamped data and the generated hierarchical structure.

In some cases, the timestamped data is associated with an original hierarchical structure, and wherein the hierarchical structure is optimized for hierarchical analysis such that the hierarchical analysis, when performed using the generated hierarchical structure, is more accurate than a hierarchical analysis performed using the original hierarchical structure. In some cases, the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes. In some cases, comparing the first order with the second order comprises comparing hierarchical analysis results associated with the first order with hierarchical analysis results associated with the second order. In some cases, comparing the first order with the second order comprises comparing an approximation measurement of the first order with an approximation measurement of the second order, wherein the approximation measurement of the first order and the approximation measurement of the second order are obtainable without performing hierarchical analysis. In some cases, ordering the selected attributes comprises sequentially building an order of the selected attributes, and wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises comparing all permutations of orders of the selected attributes. In some cases, ordering the selected attributes comprises: determining a number of the selected attributes; comparing the number of the selected attributes to a threshold value; comparing all permutations of orders of the selected attributes if the number of selected attributes does not exceed the threshold value; and sequentially building an order of the selected attributes if the number of the selected attributes exceeds the threshold value, wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement. In some cases, ordering the selected attributes comprises receiving a user selection associated with the set of attributes and ordering the selected attributes using the user selection, wherein the user selection is indicative of a desired order for each of the set of attributes. In some cases, ordering the selected attributes comprises modeling the selected attributes, and wherein modeling the selected attributes comprises: determining a Bayesian criteria associated with each of the selected attributes by performing a linear regression using the selected attributes as independent variables; and ordering the selected attributes according to decreasing order of the Bayesian criteria associated with each of the selected attributes.

Embodiments of the present disclosure include a system, comprising: one or more data processors; and a non-transitory computer-readable storage medium containing instructions which, when executed on the one or more data processors, cause the one or more data processors to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; and generating cluster results using the weight values for each of the set of cross features, wherein the cluster results are usable to cluster the timestamped data for analyzing the timestamped data.

In some cases, the operations further comprise displaying the clustered timestamped data. In some cases, the operations further comprise: modeling the clustered timestamped data using a set of features other than the set of cross features; and outputting the set of features used to model the clustered timestamped data as a set of selected features. In some cases, the set of selected features is a subset of the set of attributes of the timestamped data. In some cases, modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model. In some cases, selecting the set of features comprises identifying attributes of the set of attributes of the timestamped data having a gini index greater than zero. In some cases, selecting the set of features comprises identifying attributes of the set of attributes of the timestamped data having an information gain greater than a threshold number. In some cases, the operations further comprise generating an order of the set of selected features, and wherein generating the order comprises sequentially fixing each of the set of selected features into the order. In some cases, the operations further comprise selecting an order of the set of selected features, wherein selecting the order comprises: identifying multiple possible orders of the set of selected features; computing results for each of the identified possible orders; and selecting the order based on the computed results for each of the identified possible orders. In some cases, the operations further comprise decomposing the timestamped data to extract a trend component prior to clustering the timestamped data.

Embodiments of the present disclosure include a computer-implemented method, comprising: one or more data processors; and a non-transitory computer-readable storage medium containing instructions which, when executed on the one or more data processors, cause the one or more data processors to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; and generating cluster results using the weight values for each of the set of cross features, wherein the cluster results are usable to cluster the timestamped data for analyzing the timestamped data.

In some cases, the method further comprises displaying the clustered timestamped data. In some cases, the method further comprises: modeling the clustered timestamped data using a set of features other than the set of cross features; and outputting the set of features used to model the clustered timestamped data as a set of selected features. In some cases, the set of selected features is a subset of the set of attributes of the timestamped data. In some cases, modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model. In some cases, selecting the set of features comprises identifying attributes of the set of attributes of the timestamped data having a gini index greater than zero. In some cases, selecting the set of features comprises identifying attributes of the set of attributes of the timestamped data having an information gain greater than a threshold number. In some cases, the method further comprises generating an order of the set of selected features, and wherein generating the order comprises sequentially fixing each of the set of selected features into the order. In some cases, the method further comprises selecting an order of the set of selected features, wherein selecting the order comprises: identifying multiple possible orders of the set of selected features; computing results for each of the identified possible orders; and selecting the order based on the computed results for each of the identified possible orders. In some cases, the method further comprises decomposing the timestamped data to extract a trend component prior to clustering the timestamped data.

Embodiments of the present disclosure include a computer-program product tangibly embodied in a non-transitory machine-readable storage medium, including instructions configured to cause a data processing apparatus to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; and generating cluster results using the weight values for each of the set of cross features, wherein the cluster results are usable to cluster the timestamped data for analyzing the timestamped data.

In some cases, the operations further comprise displaying the clustered timestamped data. In some cases, the operations further comprise: modeling the clustered timestamped data using a set of features other than the set of cross features; and outputting the set of features used to model the clustered timestamped data as a set of selected features. In some cases, the set of selected features is a subset of the set of attributes of the timestamped data. In some cases, modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model. In some cases, selecting the set of features comprises identifying attributes of the set of attributes of the timestamped data having a gini index greater than zero. In some cases, selecting the set of features comprises identifying attributes of the set of attributes of the timestamped data having an information gain greater than a threshold number. In some cases, the operations further comprise generating an order of the set of selected features, and wherein generating the order comprises sequentially fixing each of the set of selected features into the order. In some cases, the operations further comprise selecting an order of the set of selected features, wherein selecting the order comprises: identifying multiple possible orders of the set of selected features; computing results for each of the identified possible orders; and selecting the order based on the computed results for each of the identified possible orders. In some cases, the operations further comprise decomposing the timestamped data to extract a trend component prior to clustering the timestamped data.

BRIEF DESCRIPTION OF THE DRAWINGS

The specification makes reference to the following appended figures, in which use of like reference numerals in different figures is intended to illustrate like or analogous components.

FIG. 20 is an example of a chart comparing error rates associated with a non-hierarchy, a user-provided hierarchy, and an automatically generated hierarchy when mean absolute percentage error is used as the model selection criteria and auto reconciliation criteria according to certain aspects of the present disclosure.

FIG. 21 is an example of a chart comparing error rates associated with a non-hierarchy, a user-provided hierarchy, and an automatically generated hierarchy when mean squared error is used as the model selection criteria and auto reconciliation criteria according to certain aspects of the present disclosure.

DETAILED DESCRIPTION

Figure 1:
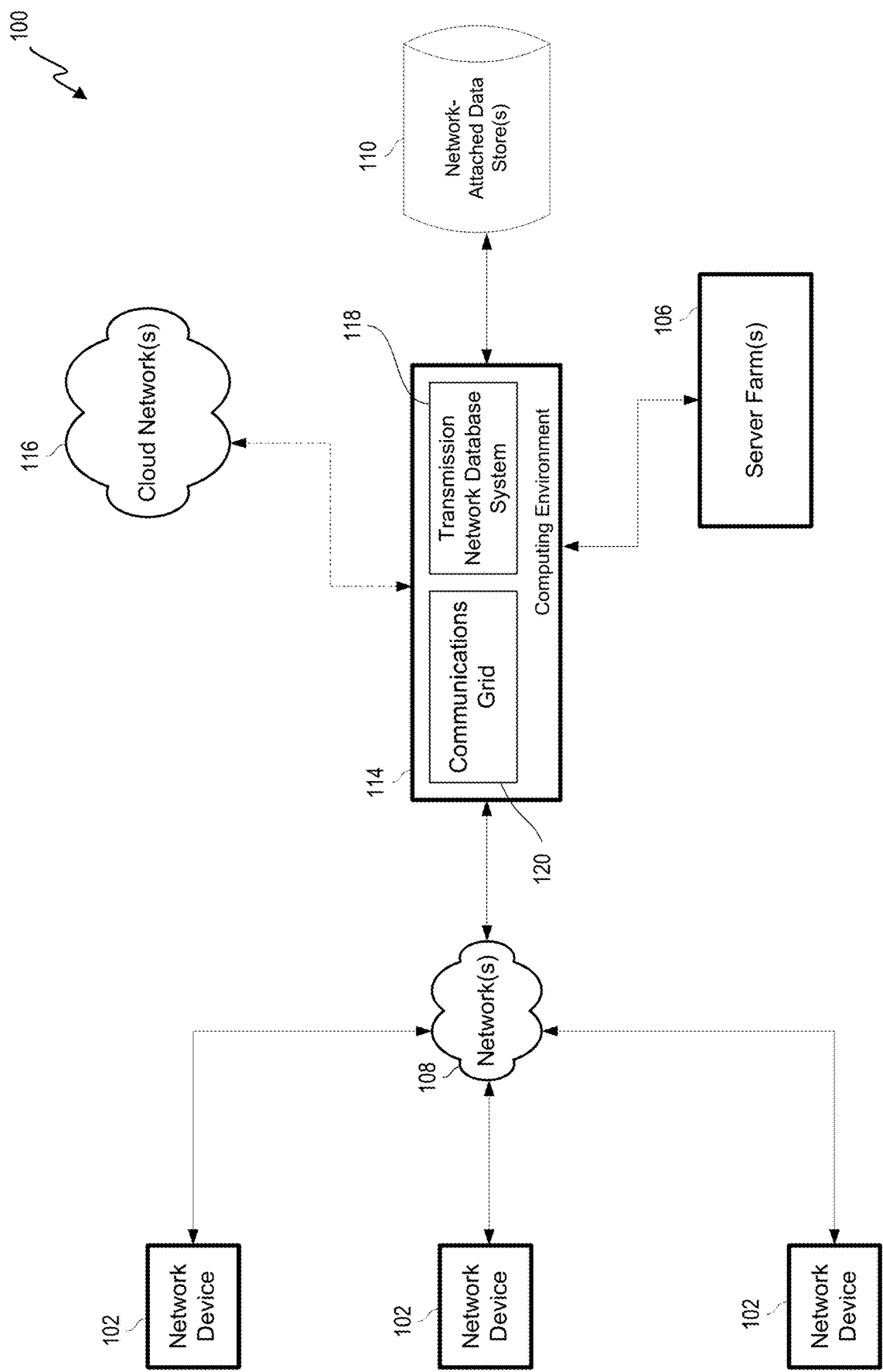
FIG. 1 illustrates a block diagram that provides an illustration of the hardware components of a computing system, according to some embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Timestamped data can represent one or more time series. These time series can be analyzed to generate useful and actionable information. In some cases, time series can be analyzed directly. However, in some cases, it can be desirable to make use of hierarchical analyzing techniques (e.g., hierarchical forecasting) to generate improved information, such as improved predictions. In hierarchical forecasting, the time series can be organized according to a hierarchical structure based on various attributes or variables, such as based on geography, region, store number, product type, and/or others. In a component failure example, a hierarchical structure may be based on attributes or variables such as geography, region, location, system group, system, machine, sub-system, component, and/or others. Hierarchies can have any number of levels, such as two or more levels, with each level representing a unique attribute or variable. Hierarchical forecasting involves performing forecasts at one level of the hierarchy and using that forecast to help generate the result (e.g., forecast) for the next level of the hierarchy. For example, the results at each level can be summed, thus informing the results for the level above. When the data are grouped, the results of each group should be equal to the results of the individual series making up the group.

Current approaches to hierarchical time series forecasting generally involve either a top-down method or a bottom-up method, or a combination of both methods often referred to as the "middle-out" approach. Hierarchical analysis is helpful for improving the overall signal to noise ratio (SNR) in the analysis, since high levels of the hierarchy may have important details washed out by too much aggregation (e.g., inability to see important per-component trends from location aggregated data) and because lower levels of the hierarchy may be sparse or noisy (e.g., if a particular location does not use certain machines regularly or only occasionally). Choosing a reconciliation level somewhere in the hierarchy, where the forecast signals are stronger, enables propagation of the forecasts up or down to obtain more reliable results at every level.

Hierarchical analysis, however, is only as effective as the underlying hierarchy upon which the analysis is built. Current hierarchical analysis is performed based on user-provided hierarchical structures, where the user selects which attributes or variables are to be used for each level of the hierarchy. For example, a user may indicate that the hierarchical analysis is to be performed using a hierarchical structure that has a regional level followed by an individual store level. These hierarchical structures make sense to users and are often based on how the users understand, plan, or visualize their organizations. While the user-provided hierarchical structure might make sense to the user from a planning perspective, such a hierarchical structure may not perform well under a hierarchical analysis, and may result in incorrect or less accurate results.

Additionally, data sets can often have multiple dimensions of hierarchy, which can be difficult to all incorporate into a hierarchical structure. In a component failure example, one dimension may be component and a second dimension may be location. Along the component dimension, attributes or variables may include levels like department, sub-system, system, category, brand, system group, and the like. Along the location dimension, attributes or variables may include levels like individual location (e.g., factory), sub-region, region, state, country, and the like. When incorporating both the component and location dimensions into a hierarchical structure, it can be difficult to make a determination as to hierarchical order, such as whether to cluster by system first and then individual location, or individual location first and then system.

Therefore, while user-provided hierarchical structures are used in the standard technique for generating hierarchical analyses, such analyses may result in less accurate predictions and missed opportunities in various fields. In the aforementioned examples, such missed opportunities could include not detecting an upcoming need for maintenance resulting in a critical part failure, not identifying an upcoming need for rail cars in a region resulting in undesired shipping delays, and not detecting a potential health issue for a hospital patient that would otherwise have been detected, Such missed opportunities may have been avoided had the organization been able to leverage more accurate hierarchical analysis results, such as those derived from a hierarchical structure that is more optimal for hierarchical analysis purposes.

Certain aspects and features of the present disclosure relate to automatically determining a hierarchical structure (e.g., a hierarchy) to use in hierarchical analysis (e.g., hierarchical forecasting) and processing of timestamped data. This automated approach to determining a hierarchical structure involves identifying attributes of the timestamped data, clustering the timestamped data to select attributes for the hierarchy, ordering the attributes to achieve a recommended hierarchical order, and optionally modifying the hierarchical order based on user input. Through the approach disclosed herein, a hierarchy can be generated that is designed to perform well under hierarchical models. This recommended hierarchy for use in hierarchical analysis may be agnostic to any planned hierarchy provided by or used by a user to otherwise interpret the timestamped data.

Certain aspects of the present disclosure relate to generating hierarchical structures from input data. The input data can be a collection of timestamped data, with or without optional, additional non-timestamped data. Timestamped data can be any data associated with a timestamp. In some cases, input data can include one or more tables, each table containing multiple rows of timestamped data. In some cases, each row of timestamped data can represent a single entry or data point. Each entry can contain one or more distinct values. In some cases, each entry (e.g., row) can be associated with one or more attributes (e.g., columns of a table of timestamped data). For example, in a table representing machine use, each entry can include a timestamp, a value associated with the machine being used, a value associated with a quantification of use (e.g., time and/or speed), a value associated with the location (e.g., factory), and a value associated with the region. The attributes can also be referred to as variables. Other examples of attributes include geography, product type, software download file type, product identifiers, quantities sold, stores, and color, although any suitable attribute can be used. Often, timestamped data is stored in a sparse data format, such as a sparse matrix. A collection of timestamped data can be referred to as a time series or as time series data.

This timestamped data can be leveraged in various ways to provide invaluable information and insight across many fields. Hierarchical analysis is an effective method to improve the accuracy of forecast results, especially for large time series data with some type of hierarchical structure. Hierarchical analysis is capable of pooling information at different aggregation levels to reduce noise. However, the success, efficacy, and accuracy of the hierarchical analysis is dependent on the hierarchical structure used. Generally, current hierarchical analysis techniques use the hierarchical structure provided by a user, which is often the hierarchical structure used by the user to plan and understand the organization associated with the timestamped data. This hierarchical structure used by the user to plan and understand the organization can be referred to as a planned hierarchy. For example, a planned hierarchy for products in an organization may start with a topmost country level and decrease in level through region levels, state levels, and eventually the individual store level. Such a planned hierarchy may be useful to a human since it takes on an intuitive layout, however this hierarchy may be sub-optimal for generating efficient and/or accurate hierarchical analysis results. Certain aspects and features of the present disclosure relate to automatically generating a hierarchical structure to perform well in hierarchical analysis, sometimes agnostic to any existing, planned hierarchy.

The ability to automatically generate a recommended hierarchy for hierarchical analysis permits organizations to utilize any suitable hierarchy for organizational purposes, while performing hierarchical analysis using a recommended hierarchy that is specifically generated for or optimized for hierarchical analysis.

As described herein, hierarchical analysis involves obtaining forecast results for individual levels of the hierarchy to inform the results of other levels. Hierarchical analysis can be top-down, bottom-up, or middle-out. A benefit of hierarchical analysis is that good signals can be pooled and noise can be reduced from the data. Generally, time series at lower levels of the hierarchy are often sparse or noisy, while higher levels may have important details that would otherwise be washed out by too much aggregation. Therefore, choosing a reconciliation level somewhere in the hierarchy, where the forecast signals are stronger, enables propagation of the results up or down to obtain more reliable results at every level. Thus, making use of a well-structured hierarchy with a well-chosen reconciliation level can result in analytical results (e.g., predictions) that are accurate and not overrun with noisy data or washed out with excessive aggregation.

Timestamped data is continually becoming more prevalent as more data continues to be collected by organizations and technology for collecting such data becomes more commonplace. As a result, the size and dimensionality of timestamped data continuously increases. Often, timestamped data contains numerous attributes. Since unique combinations and orders of attributes can be used to generate possible hierarchical structures, the number of possible hierarchical structures can quickly become extremely large. Additionally, the vast amount of data points in the timestamped data can render hierarchical analysis slow. Therefore, with the large number of possible hierarchical structures and vast amount of data points in timestamped data, it can be impossible, effectively impossible, or otherwise impractical (e.g., due to excessive cost, computing power, or time) to perform hierarchical analysis using each possible hierarchical structure to determine which structure performs the best for a given set of timestamped data.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
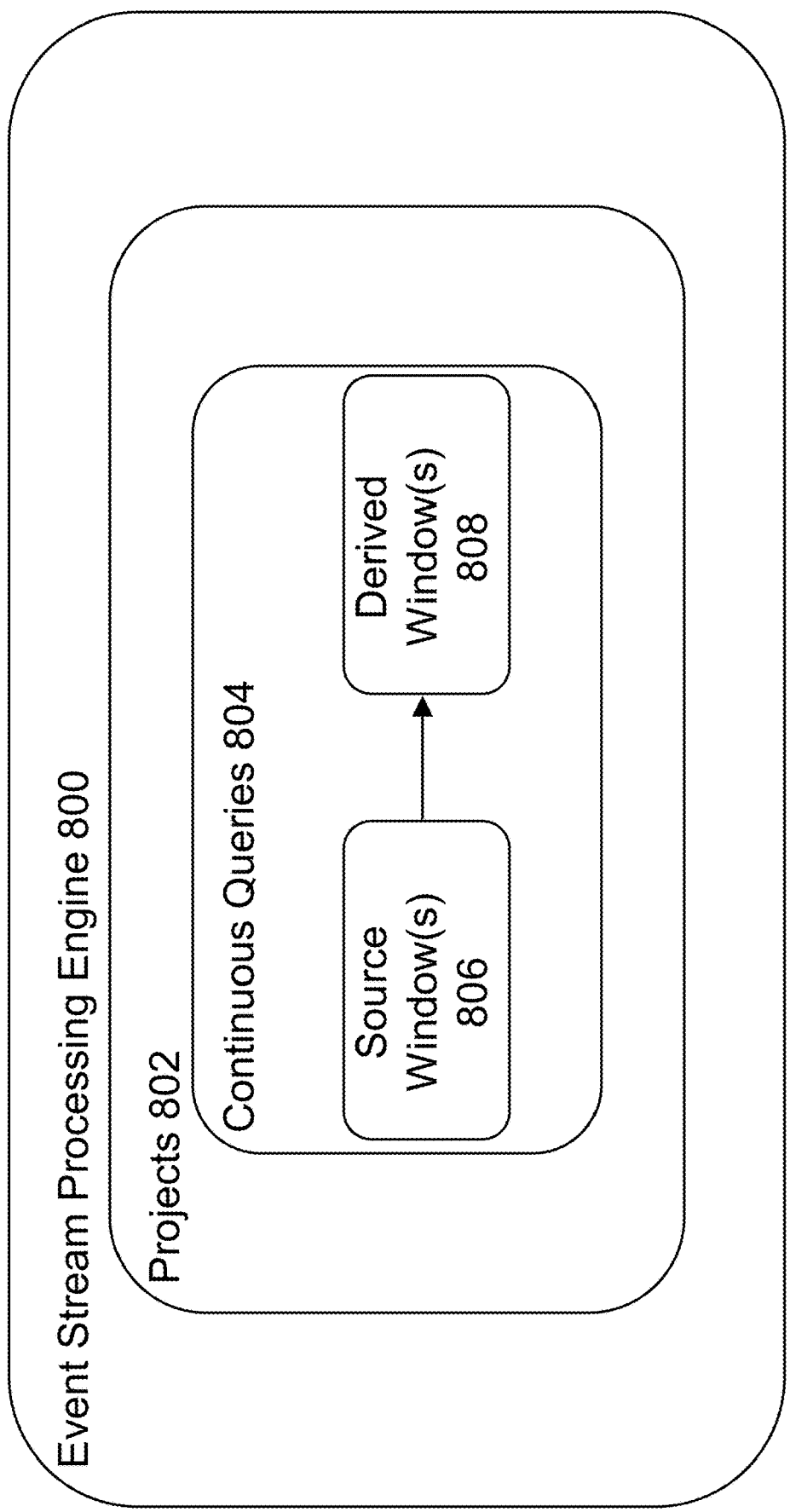
FIG. 8 illustrates a block diagram including components of an Event Stream Processing Engine (ESPE), according to embodiments of the present technology.
Figure 9:
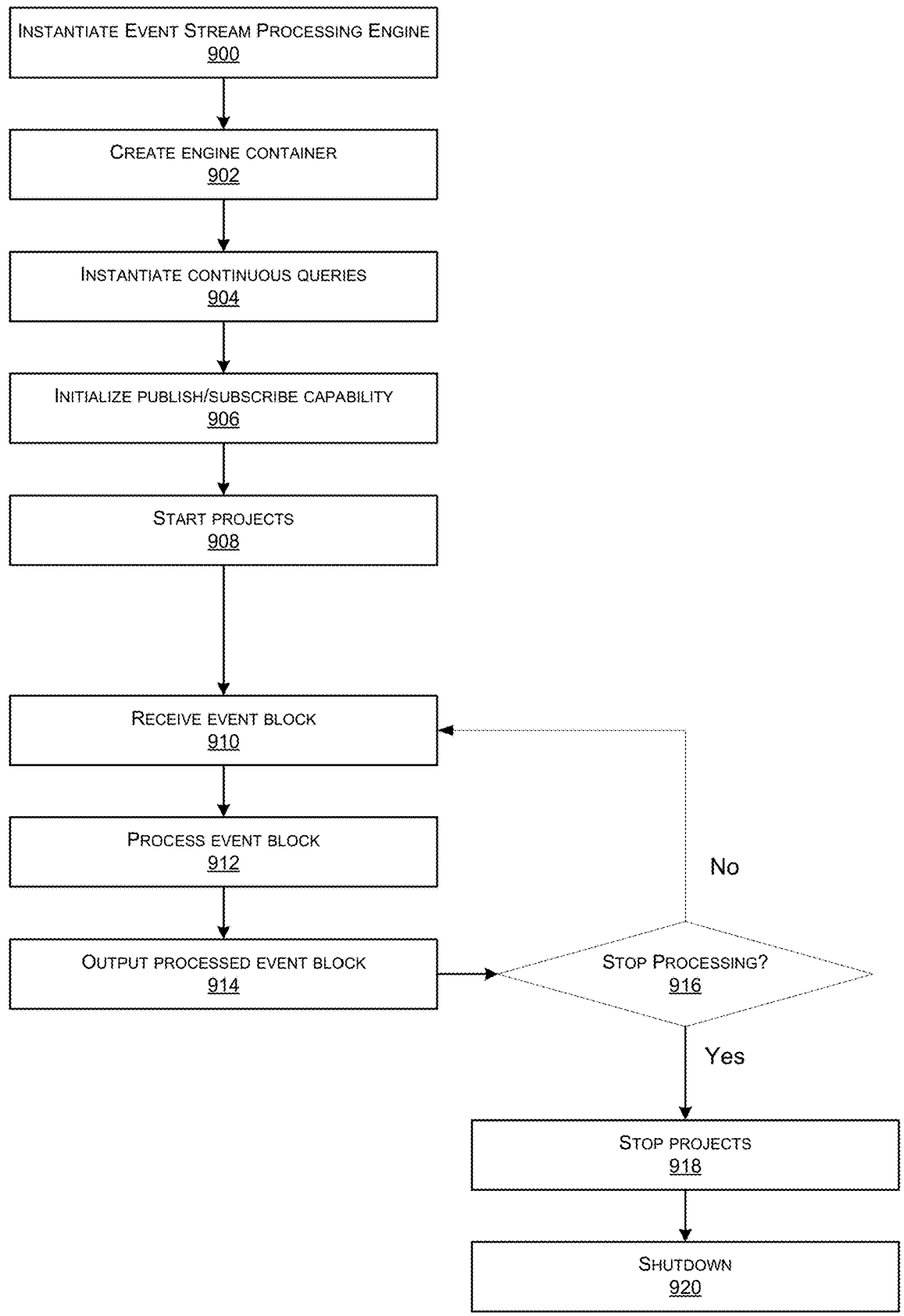
FIG. 9 illustrates a flow chart showing an example process including operations performed by an event stream processing engine, according to some embodiments of the present technology.
Figure 10:
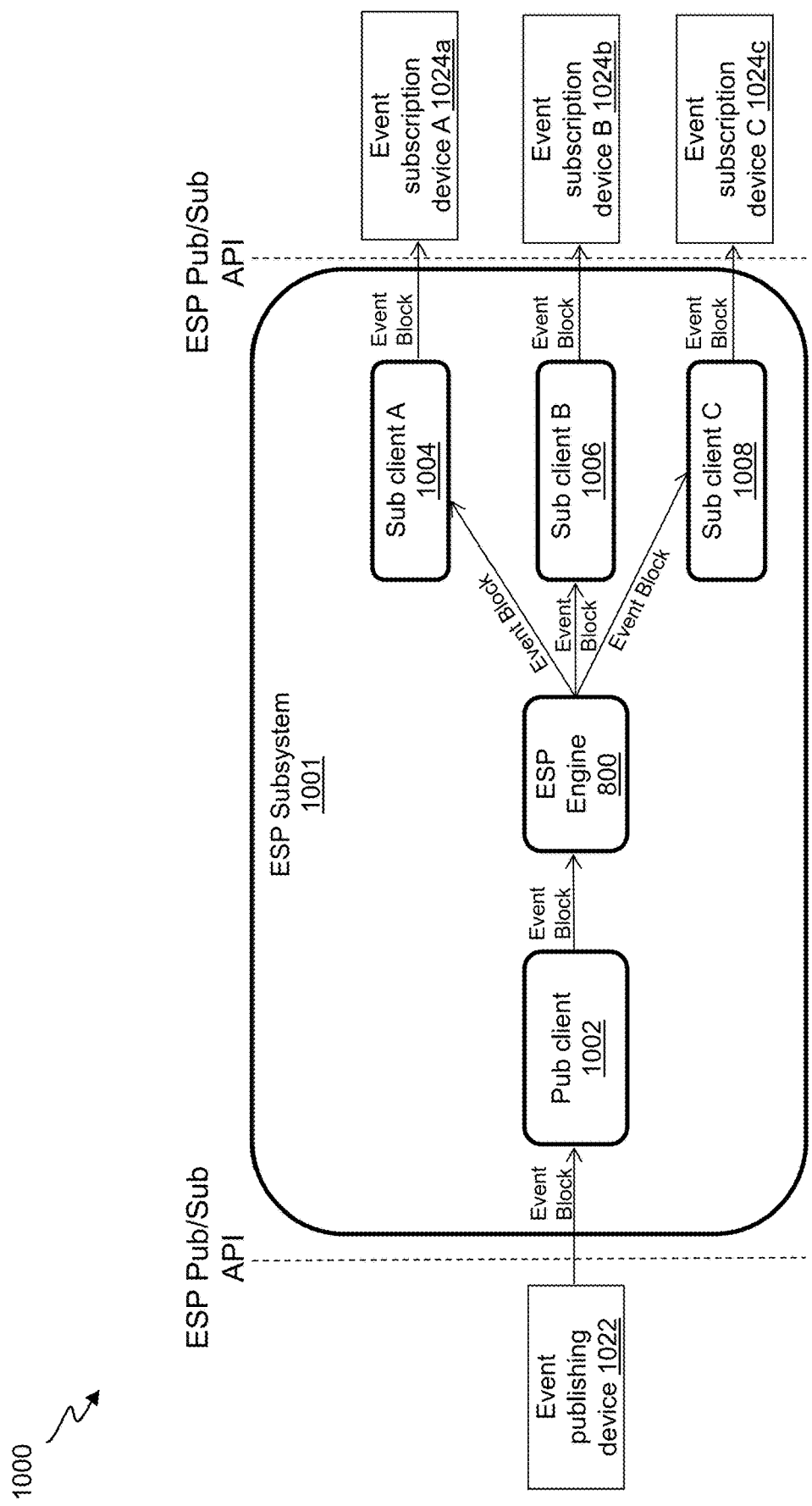
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
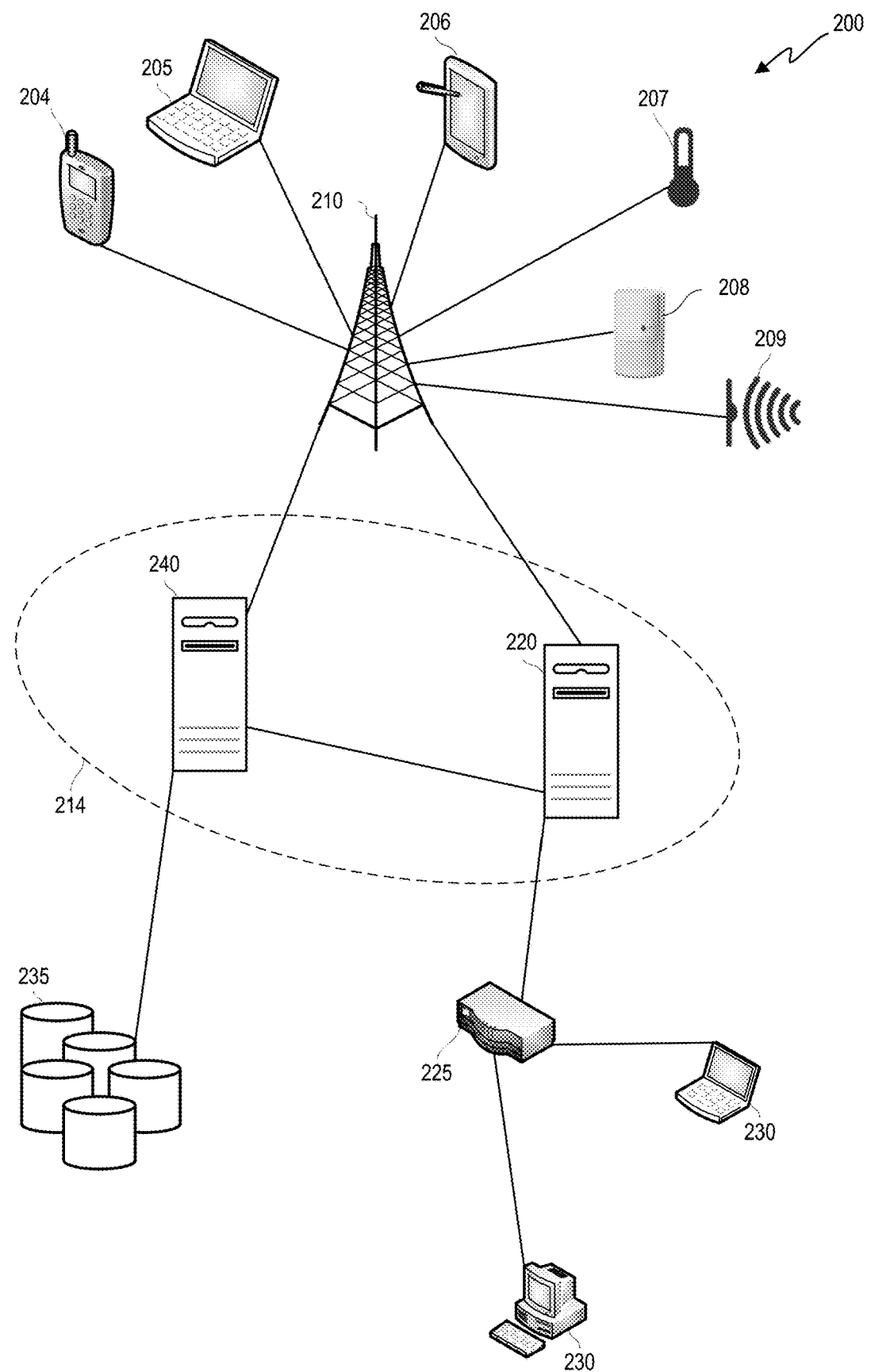
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
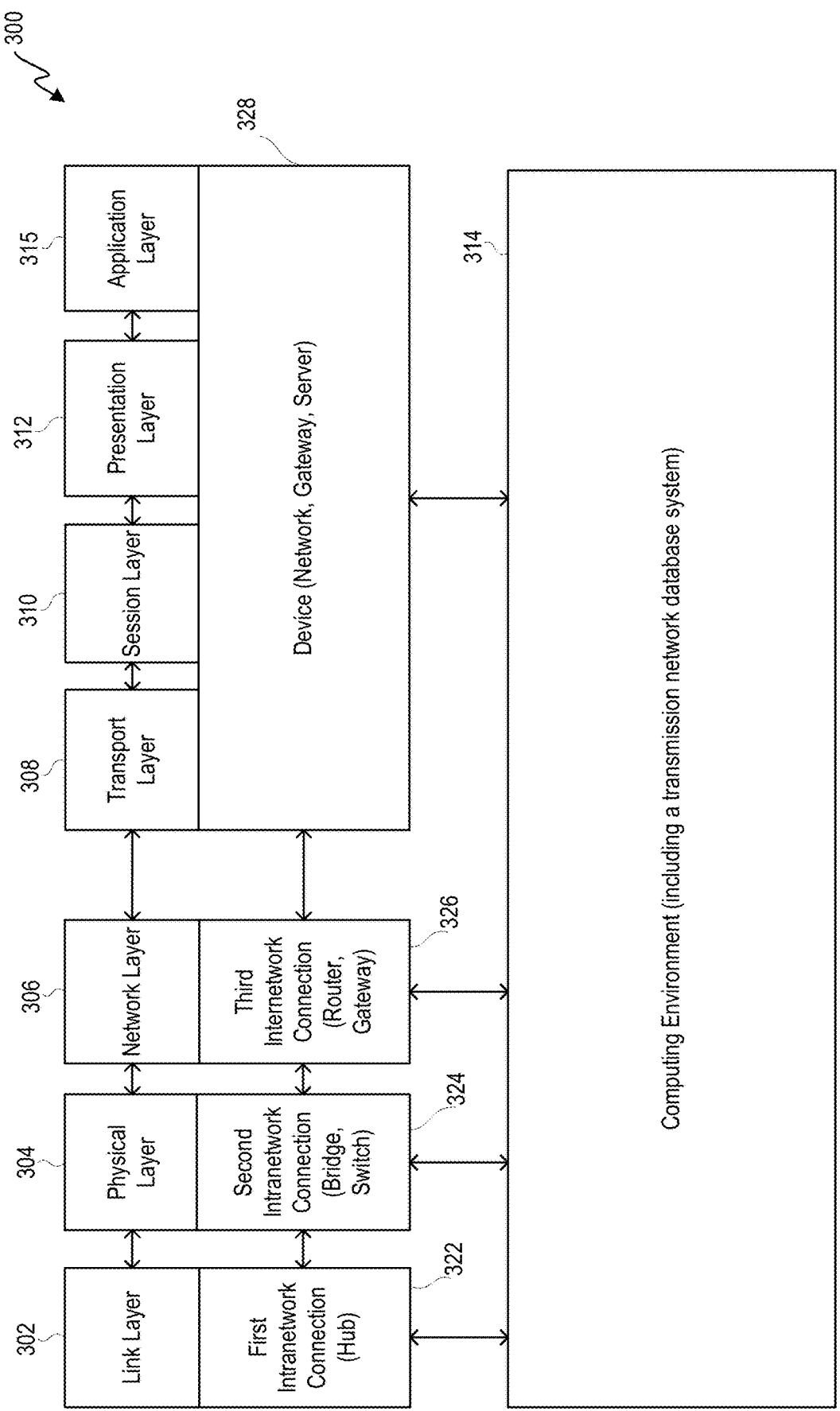
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 315 interacts directly with software applications and end users, and manages communications between them. Application layer 315 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-315. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
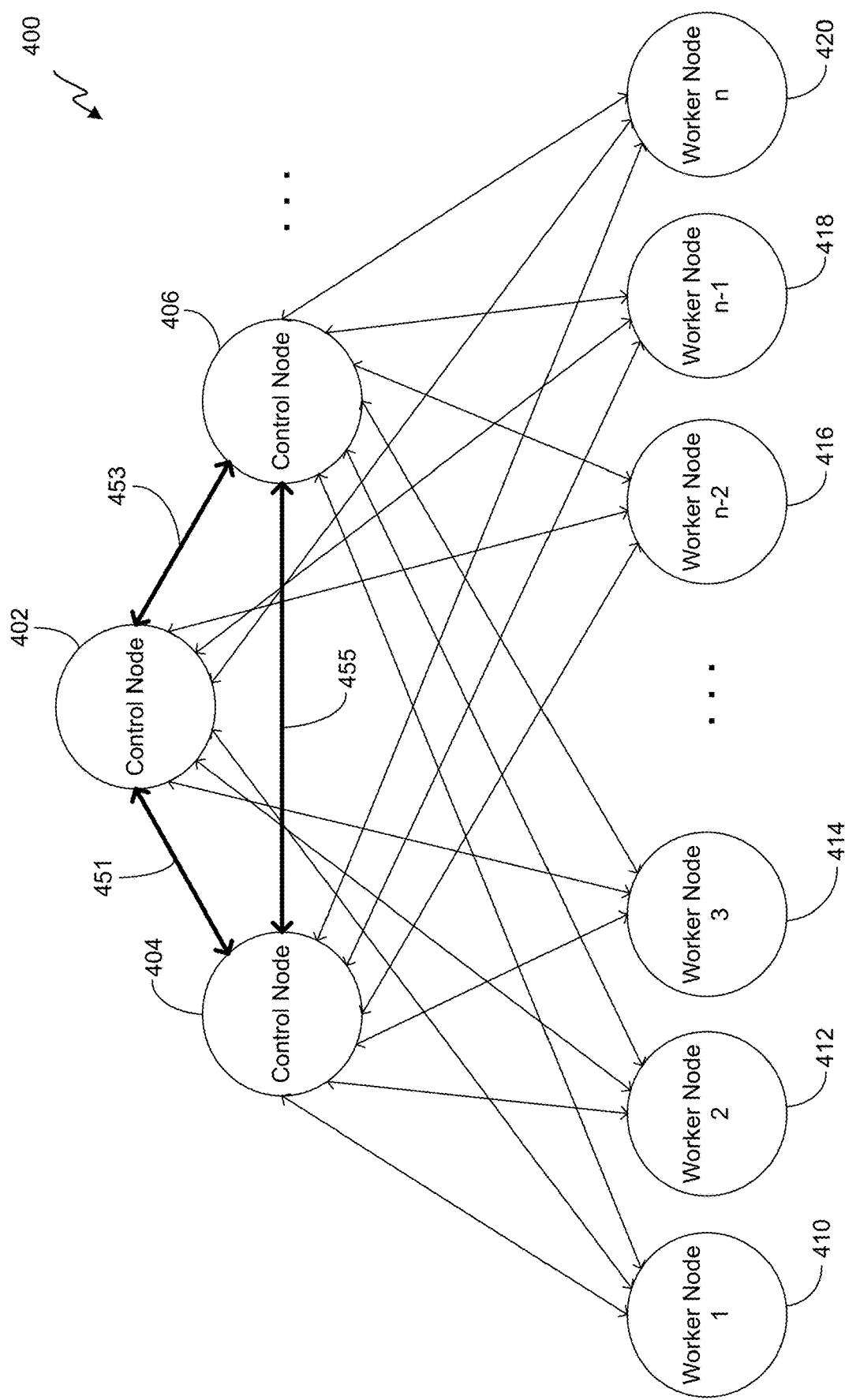
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or fewer than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
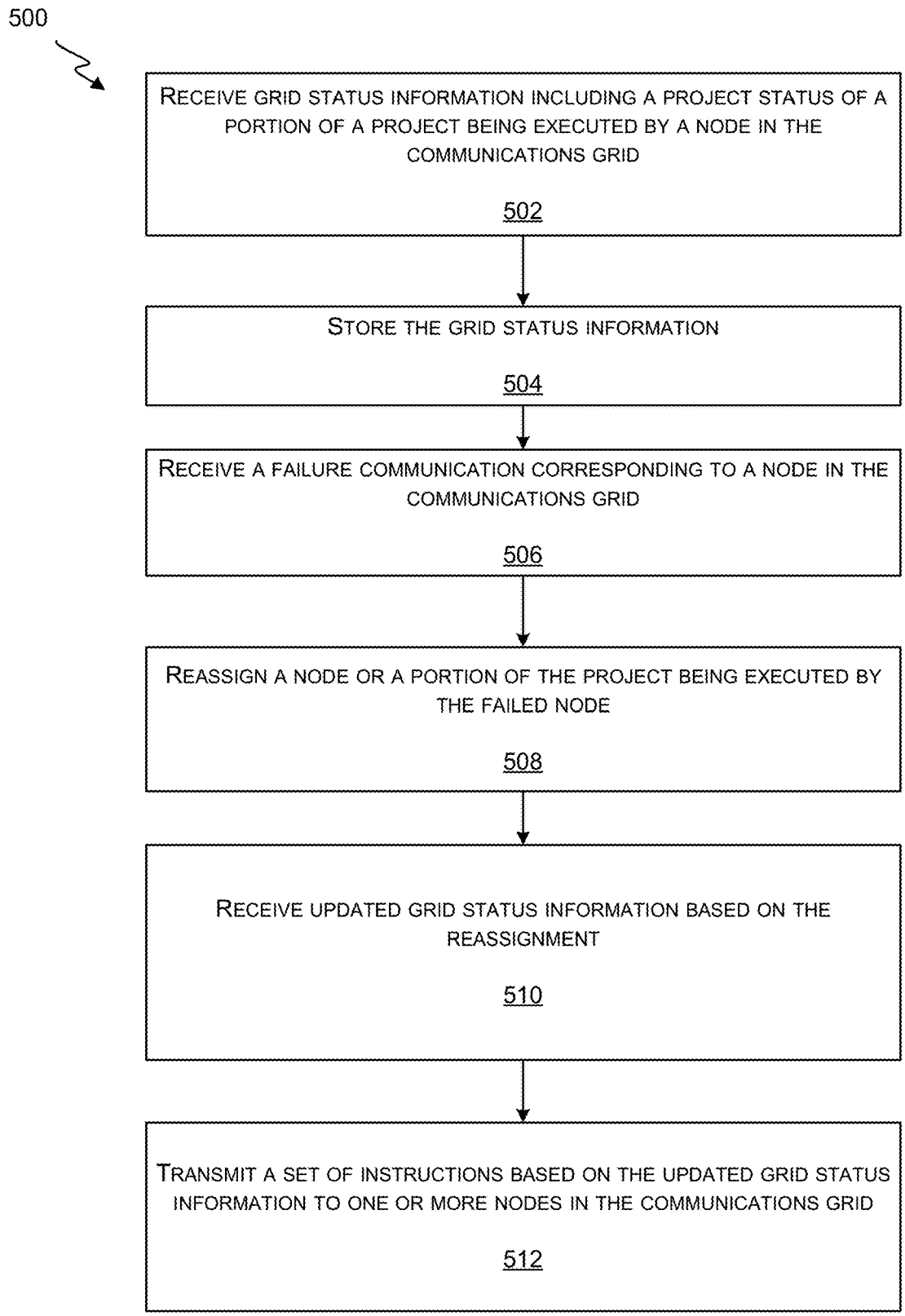
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
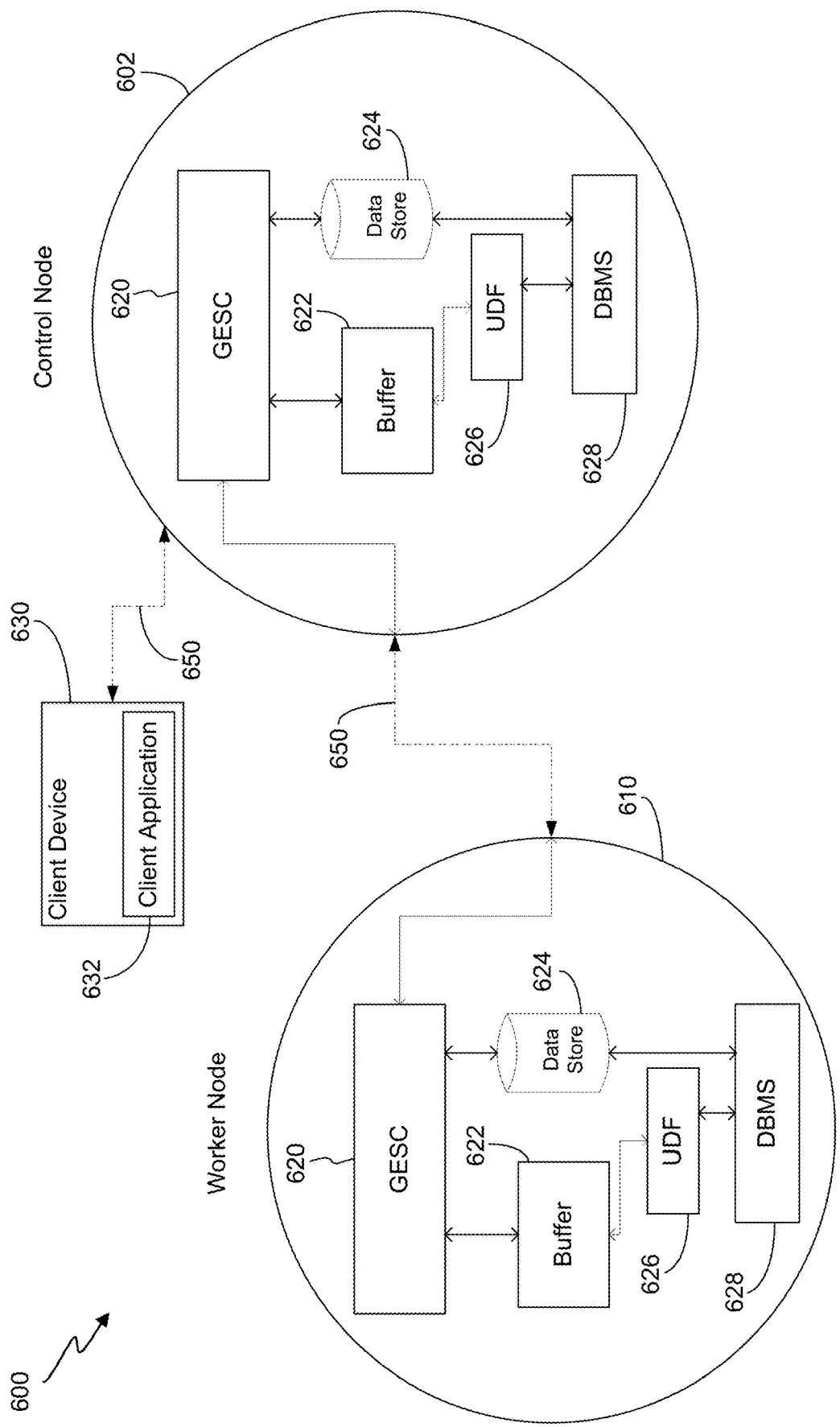
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
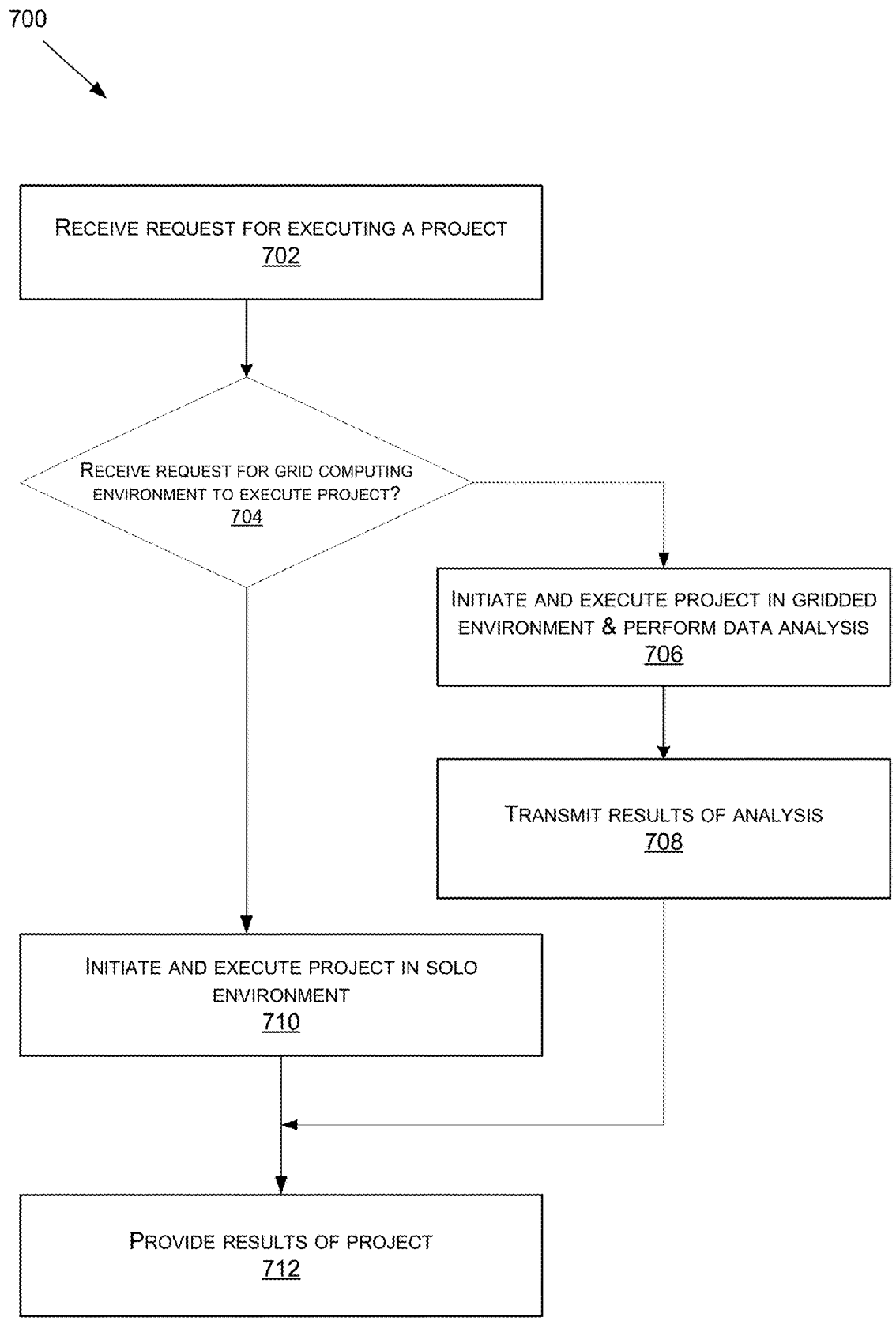
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
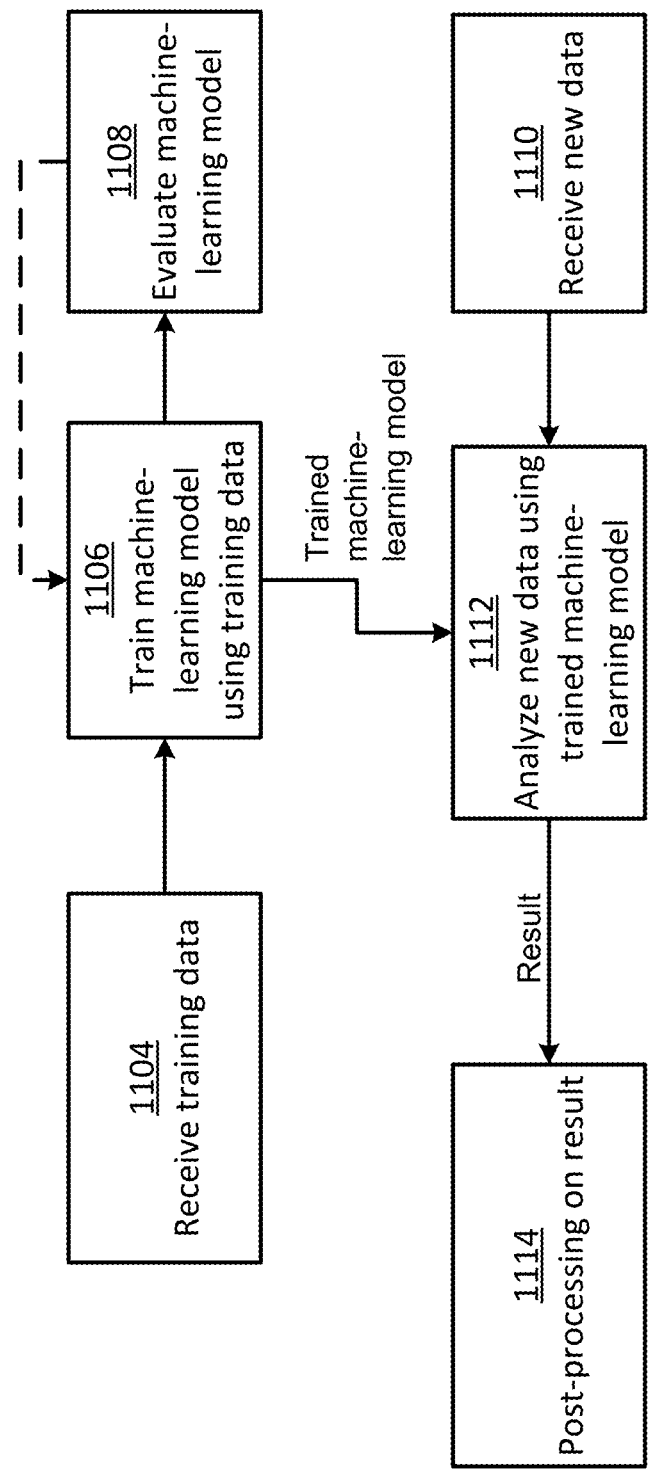
FIG. 11 illustrates a flow chart of an example of a process for generating and using a machine-learning model, according to embodiments of the present technology.

FIG. 11 illustrates a flow chart of an example of a process for generating and using a machine-learning model, according to embodiments of the present technology. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
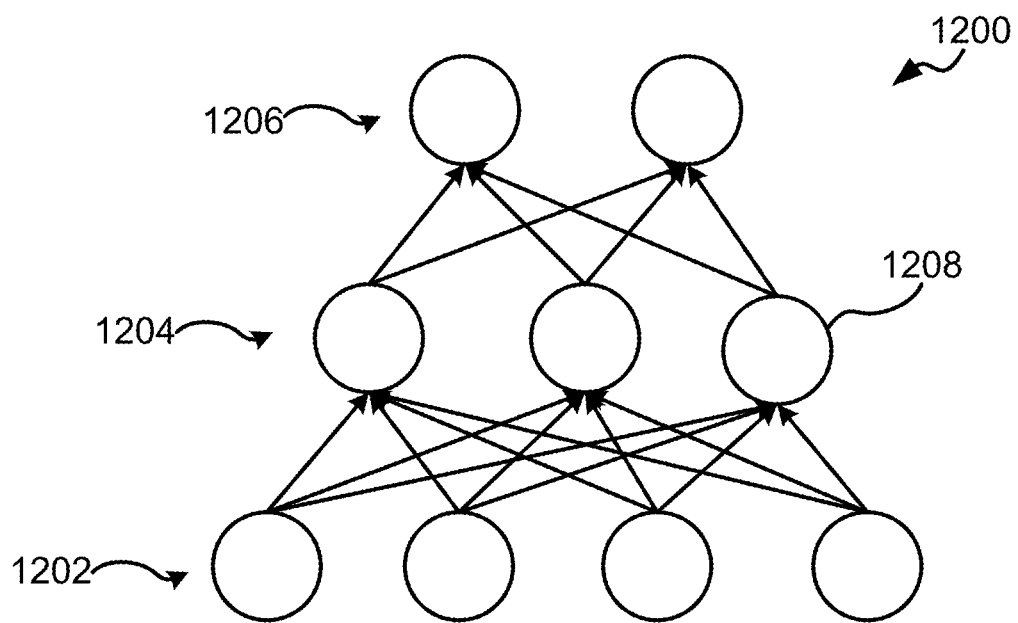
FIG. 12 illustrates a neural network that represents a more specific example of a machine-learning model, according to embodiments of the present technology.

A more specific example of a machine-learning model is the neural network 1200 shown in FIG. 12, according to embodiments of the present technology. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

y=max(x, 0), where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
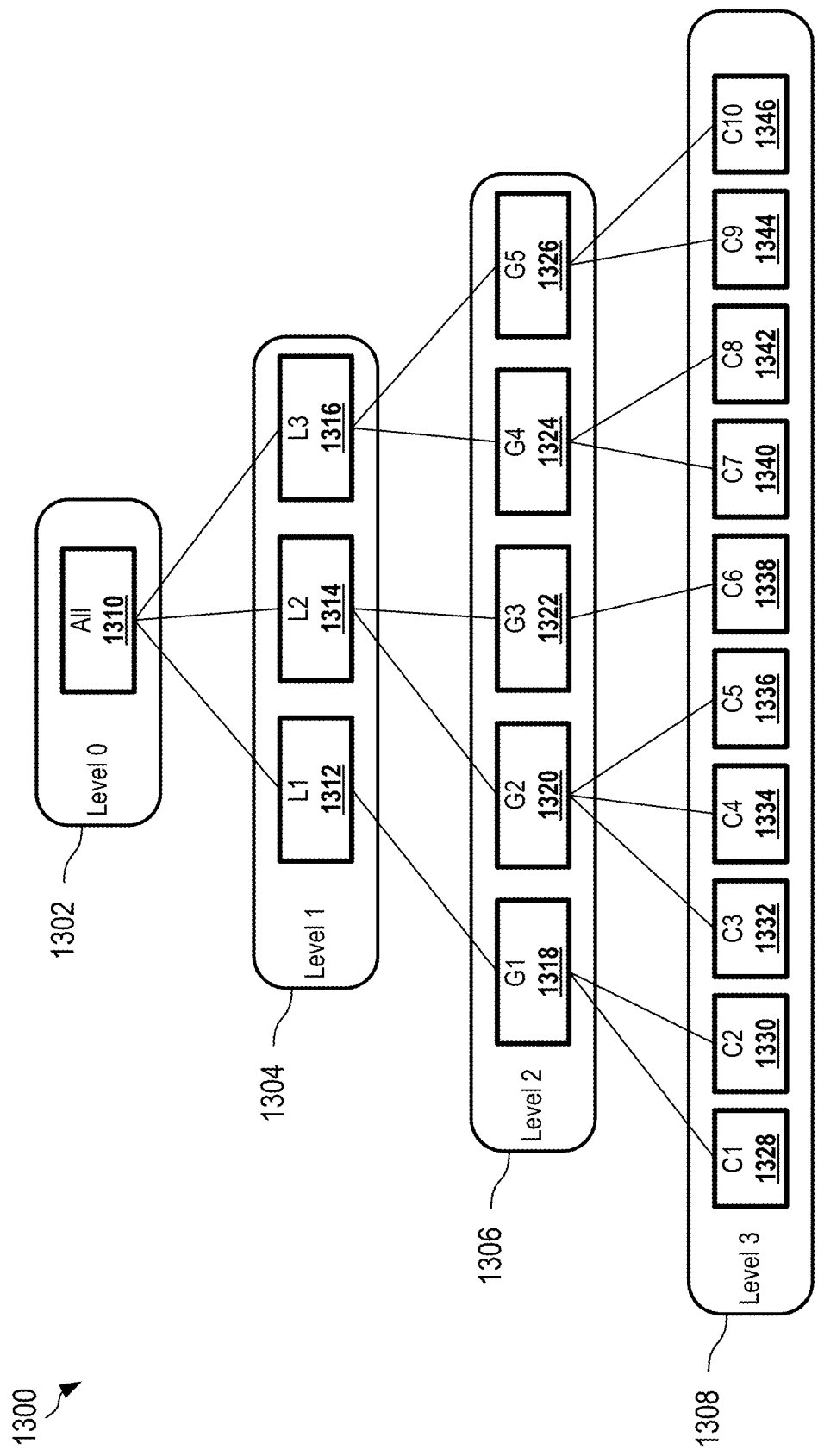
FIG. 13 is a schematic diagram depicting an example of a hierarchy according to certain aspects of the present disclosure.

FIG. 13 is a schematic diagram depicting an example of a hierarchy 1300 according to certain aspects of the present disclosure. The hierarchy 1300 comprises four different levels 1302, 1304, 1306, 1308, although any number of levels can be used. Level 0 1302 can be referred to as the highest level of the hierarchy 1300, with the hierarchy progressing down until the lowest level, level 3 1308. Each level 1302, 1304, 1306, 1308 contains some number of nodes, denoted as boxes with thick edges, each of which represents a time series.

For purposes of describing the hierarchy 1300, a component failure example will be used, although any suitable timestamped data can be used. In this example, components can be parts of a system or machine (e.g., gearbox, bearings, brakes, motors, and other equipment of a wind turbine) that can wear out over time. The component failure timestamped data can contain attributes (e.g., variables) for component identifier, system group (e.g., main powertrain, yaw movement), and location (e.g., longitude and latitude coordinates). In the hierarchy 1300, level 3 1308 can be organized by component identifier, level 2 1306 can be organized by system group, level 1 1304 can be organized by location, and level 0 1302 can represent the entire set of timestamped data. For the data depicted in hierarchy 1300, there can be three locations denoted L1, L2, and L3; five system groups denoted G1, G2, G3, G4, and G5; and ten component identifiers denoted C1, C2, C3, C4, C5, C6, C7, C8, C9, and C10.

Using this example, at level 0 1302, the All node 1310 represents a time series containing all of the timestamped data associated with the hierarchy 1300. At level 1 1304, the L1 1312, L2 1314, and L3 1316 nodes can represent individual time series associated with location L1, location L2, and location L3, respectively. Location L1 1312 can comprise system group G1 1318, which can comprise component identifiers C1 1328 and C2 1330. Location L2 1314 can comprise system group G2 1320—which itself comprises component identifiers C3 1332, C4 1334, and C5 1336—and G3 1322, which comprises component identifier C6 1338. Location L3 1316 can comprise system group G4 1324—which itself comprises component identifiers C7 1340 and C8 1342—and G5 1326, which comprises component identifiers C9 1344 and C10 1346. In the example of a set of wind turbines, some wind turbines may have the same system groups and components and other wind turbines may have different system groups and/or components.

When conducting a hierarchical analysis, one of the levels 1302, 1304, 1306, 1308 can be selected as the reconciliation level. If level 1 1304 were chosen as the reconciliation level, the time series associated with L1 1312, L2 1314, and L3 1316 would each be forecast and those results would be propagated up to level 0 1302 and down to level 2 1306 to obtain the results for those levels. The results from level 2 1306 would be further propagated down to level 3 1308 to obtain the results for that level.

As seen in hierarchy 1300, the attributes are selected and arranged in a particular order (e.g., location, then system group, then component identifier). In some cases, hierarchy 1300 may be a planned hierarchy, in which case the attributes were selected and ordered manually based on user preference (e.g., to optimize readability or ability to quickly understand the data). In some cases, such a planned hierarchy may include irrelative attributes or otherwise unhelpful selected attributes and/or attribute orders. While the planned hierarchy may be suitable for human use, it may not be well-suited for hierarchical analysis. For example, some components of a wind turbine with similar wear patterns may be located far away in the hierarchy because of the way the planning hierarchy is organized. For example, while it may be easy to imagine components as being organized by system group, it may be more suitable to accurate hierarchical analysis for component failure planning purposes to organize them by location (e.g., components on wind turbines located near the sea may need to be repaired sooner than those located far from the sea).

In some cases according to certain aspects of the present disclosure, the hierarchy 1300 may be a recommended hierarchy that has been automatically generated for hierarchical analysis. Such a recommended hierarchy can have attributes selected and ordered to generate results that are accurate, more accurate, or optimized in accuracy. As used herein, the term optimized can be inclusive of a best possible result and a near-best possible result. In some cases, the term optimized, with reference to a recommended hierarchy, can be inclusive of any result that provides higher accuracy than the results from using a planned hierarchy.

Figure 14:
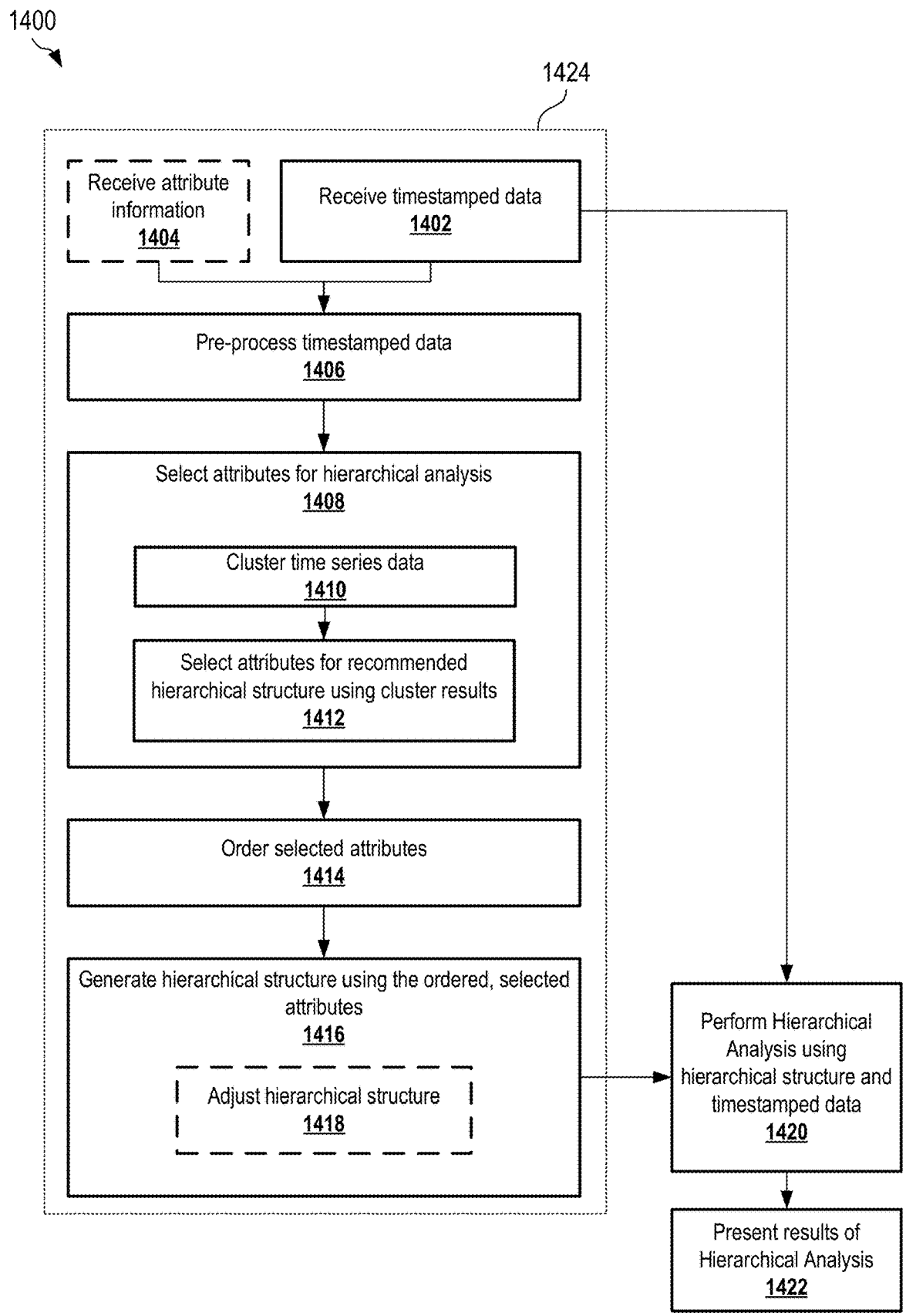
FIG. 14 is a flowchart depicting an example of a process for automatically generating and then using a hierarchical structure according to certain aspects of the present disclosure.

FIG. 14 is a flowchart depicting an example of a process 1400 for automatically generating and then using a hierarchical structure according to certain aspects of the present disclosure. The process 1400 can generate a hierarchy, such as hierarchy 1300 of FIG. 13. Process 1400 can comprise a process 1424 for generating a recommended hierarchical structure, then performing hierarchical analysis using the hierarchical structure at block 1420 and presenting the results of the hierarchical analysis at block 1422. The process 1424 for generating a recommended hierarchical structure can output the hierarchical structure in any suitable format, such as a subset of attributes in a recommended order.

At block 1402, timestamped data can be received. The timestamped data can include a plurality of data entries, each of which can include timestamp information and relevant data across one or more attributes. The timestamped data can be associated with one or more attributes, such as one or more time-independent attributes. In some cases, at optional block 1404, attribute information can be received separate from the timestamped data. Attribute information can comprise a listing of the attributes associated with the timestamped data, and optionally information about each attribute's type (e.g., numerical or categorical) or other information associated with the attribute. In some cases, some or all attribute information can be extracted from the timestamped data 1402 during pre-processing at block 1406.

At block 1406 the timestamped data, and optionally the received attribute information, can be pre-processed. In some cases, no pre-processing is necessary. Pre-processing can be used to prepare the data for further analysis. In some cases, pre-processing includes transforming the time series, such as using a logarithmic transform or other operation. In some cases, pre-processing can include removing noise. In some cases, pre-processing can include imputing missing values, such as setting empty values to "0" or assigning other default values where missing or placeholder values exist. In some cases, pre-processing can include identifying variable types (e.g., identifying attribute types, as described with reference to block 1506 of FIG. 15) In some cases, pre-processing can include applying stratified sampling to the timestamped data, which can reduce the size of the timestamped data. Stratified sampling may be performed in cases where the sampling process represents the population distributions of the attribute values and each time series is not broken during the sampling process.

At block 1408 attributes can be selected for hierarchical analysis. This attribute selection can use the timestamped data, optionally pre-processed. Attribute selection can result in a set of selected attributes, which can include all or a subset of the attributes associated with the timestamped data. In some cases, attribute selection can comprise clustering the time series data at block 1410 and selecting attributes using the cluster results at block 1412. Clustering the time series at block 1410 can comprise clustering the time series based on patterns in the time series and their response to independent variables. Ideally, the resultant clusters would be the best aggregation level for generating a forecast, however since clustering is an unsupervised learning process purely based on data, the results might be not only sensitive to the noise in the data, but also hard to interpret. Therefore, clustering results can be interpreted through attributes. After clustering the time series, selecting attributes at block 1412 can involve identifying and selecting those attributes that are sensitive to the cluster results. Selecting attributes can include using cluster results as a target variable, all attributes as input variables, and identifying important input variables for modeling the target.

At block 1414, the selected attributes can be ordered. In some cases, ordering the selected attributes can include simply fixing one level of the hierarchy at a time, such as by sequentially walking through the selected attributes and fixing it in place relative to any previously fixed-in-place attributes. In some cases, ordering the selected attributes can include globally testing different combinations of attributes to identify the best hierarchy. Since the number of selected attributes may be much lower than the overall number of attributes associated with the timestamped data, a global approach (e.g., globally testing different combinations of attributes) may be possible and advantageous, especially if the number of selected attributes is below some preset threshold value (e.g., four or five). In some cases, ordering the selected attributes can include approximating results for various possible orders of the selected attributes and selecting the best approximated result. In some cases, ordering the selected attributes can include ordering the attributes based on characteristics of the selected attributes or groupings of the selected attributes. For example, selected attributes can be ordered such that the between-group distances associated with sequential pairs of selected attributes in the ordered set of selected attributes is monotonically decreasing from a highest level of the hierarchy to a lowest level of the hierarchy.

At block 1416, a hierarchical structure can be generated using the ordered selected attributes (e.g., an ordered set of selected attributes). Generating the hierarchical structure can include simply presenting the ordered set of selected attributes or otherwise formatting or processing it into a suitable format for the hierarchical structure. In some cases, generating the hierarchical structure can optionally include adjusting the hierarchical structure at block 1418. Adjusting the hierarchical structure at block 1418 can include making adjustments based on user input or otherwise adjusting the hierarchical structure.

As described herein, the hierarchical structure can be used at block 1420, along with the timestamped data, such as timestamped data from block 1402, to perform hierarchical analysis. At block 1422, the results of the hierarchical analysis can be presented. Presenting the results of the hierarchical analysis can comprise generating a display viewable by a user. In some cases, instead of presenting the results of the hierarchical analysis, the results can be used to inform another process, such as a decision-making process, in which case the result of that subsequent process (e.g., a decision based on the results of the hierarchical analysis) can be presented.

Figure 15:
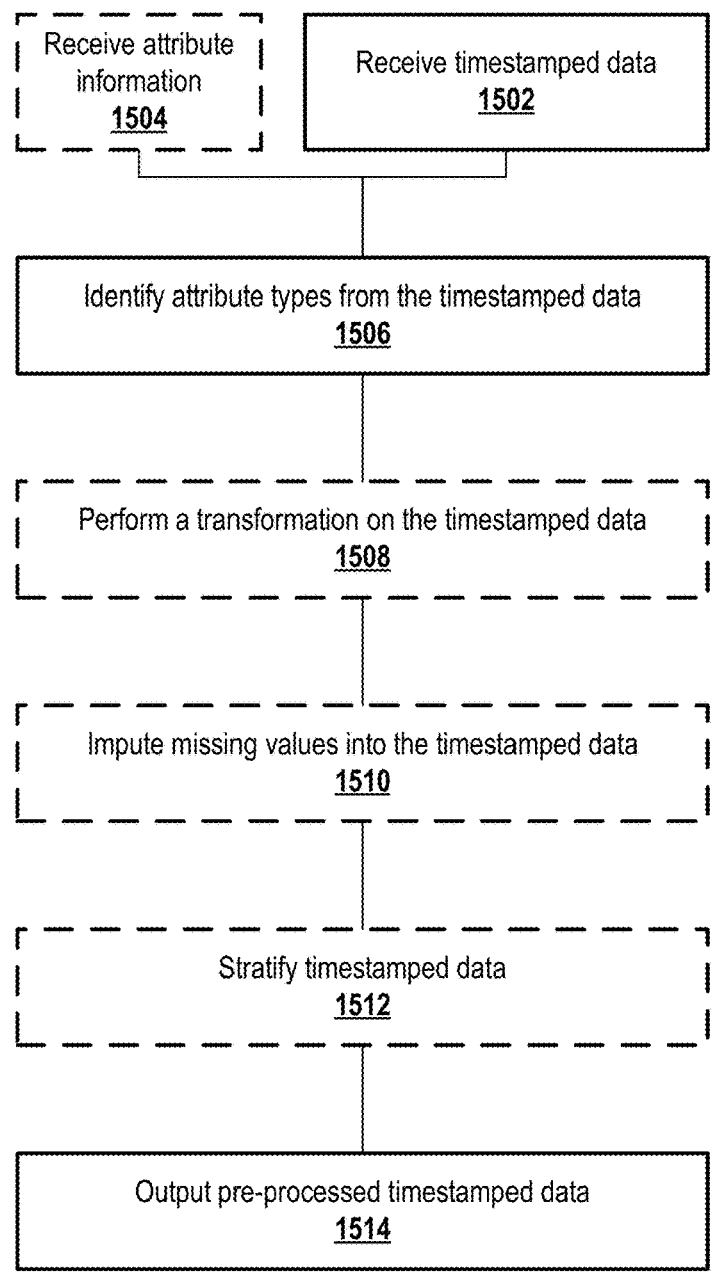
FIG. 15 is a flowchart depicting an example of a process for automatically pre-processing timestamped data according to certain aspects of the present disclosure.

FIG. 15 is a flowchart depicting an example of a process 1500 for automatically pre-processing timestamped data according to certain aspects of the present disclosure. Process 1500 can incorporate or be similar to pre-processing at block 1406 of process 1400 of FIG. 14. In some cases, any of the various blocks 1506, 1508, 1510, 1512 associated with process 1500 can be optional and/or performed in different orders than those depicted in FIG. 15.

At block 1502, timestamped data can be received. The timestamped data can include a plurality of data entries, each of which can include timestamp information and relevant data across one or more attributes. The timestamped data can be associated with one or more attributes, such as one or more time-independent attributes. In some cases, at optional block 1504, attribute information can be received separate from the timestamped data. Attribute information can comprise a listing of the attributes associated with the timestamped data, and optionally information about each attribute's type (e.g., numerical or categorical) or other information associated with the attribute. In some cases, some or all attribute information can be extracted from the timestamped data 1502 during the remainder of pre-processing at block 1506.

At block 1506, attribute types can be identified from the timestamped data. In some cases, attribute types can be identified using the received attribute information from block 1504. In some cases, attribute types can be automatically identified based on patterns or recognized values in the timestamped data. For example, values that are always 0 or 1 may be recognized to be a true/false type value. In another example, values that are always a set of distinct numbers, such as numerals between 0 and 9, may be recognized to be categorical. In another example, values that encompass ranges of numbers, such as non-integer numbers, may be recognized as being numerical. In yet another example, values that encompass ranges of numbers, such as non-integer numbers, may be recognized as categorical by appropriating the values into meaningful categories (e.g., "less than 50" or "50-200" and the like). In some cases, identification of attribute types at block 1506 can involve classifying each attribute as either a numerical attribute or a categorical attribute. In some cases, identification of attribute types at block 1506 can involve only identifying attributes that are time-independent attributes. Examples of categorical attributes can include region names, product lines, product names, store numbers, store types, and the like. Examples of numerical attributes can include values, weights, quantities, and the like.

At optional block 1508, the received timestamped data can be transformed. Transforming timestamped data can be used to help format the timestamped data into a different format, such as a format more suitable for further processing according to certain aspects of the present disclosure. Example transforms include log transforms, square transforms, and any other suitable transforms. Transforming the timestamped data at block 1508 can be based on user input or stored user-provided settings. In some cases, performing the transform at block 1508 can include receiving user input or user-provided settings associated with the transform(s) to be performed.

At optional block 1510, missing values can be imputed into the timestamped data. In some cases, empty values in the timestamped data can be replaced or filled with zero or null values. In some cases, imputing missing values can comprise replacing placeholder values with a default value or an estimated value. Since timestamped data is often very sparse, imputing missing values can facilitate any downstream calculations on the timestamped data.

At optional block 1512, the timestamped data can be stratified. Stratified sampling can reduce the size of the overall dataset. Stratified sampling can involve removing data entries from the timestamped data or by building a new set of timestamped data from selected data entries of the original timestamped data. Stratified sampling can be configured to only take samples from some of the time series to ensure there is an appropriate sampling of the different attributes of the timestamped data. Stratified sampling may occur when the sampling process represents the population distributions of the attribute values, and each time series is not broken during the sampling process.

At block 1514, pre-processed timestamped data can be output. The pre-processed timestamped data can be processed according to one or more of any combination of blocks 1506, 1508, 1510, 1512 in any suitable order.

Figure 16:
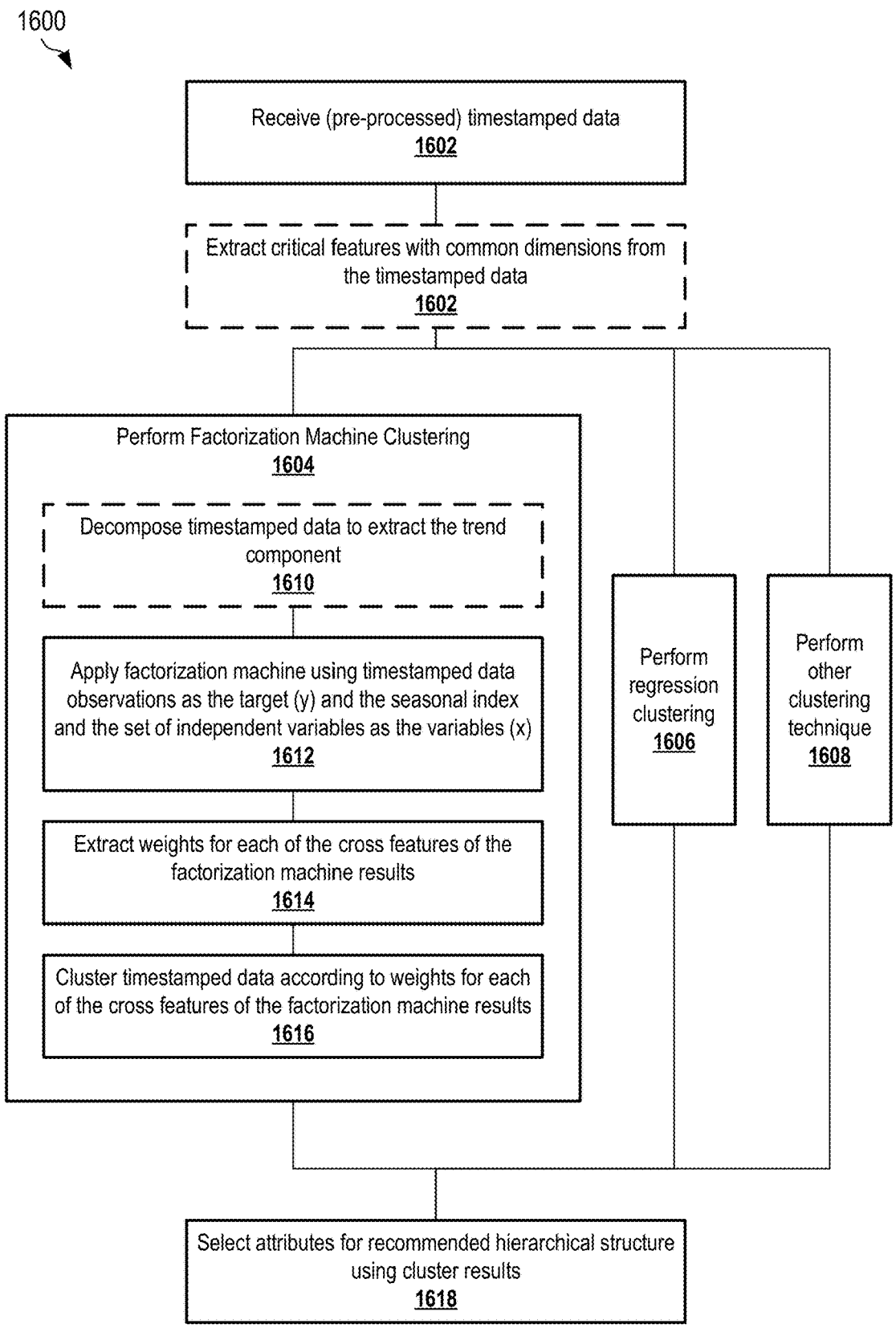
FIG. 16 is a flowchart depicting an example of a process for automatically clustering timestamped data according to certain aspects of the present disclosure.

FIG. 16 is a flowchart depicting an example of a process 1600 for automatically clustering timestamped data according to certain aspects of the present disclosure. Process 1600 can incorporate or be similar to selecting attributes at block 1408 of process 1400 of FIG. 14. At block 1602, timestamped data, optionally pre-processed, can be received.

At optional block 1602, critical features with common dimensions from the timestamped data can be optionally extracted. Extracting critical features with common dimensions can be useful when input time series have different lengths. The extracted critical features can have the same dimension from the time series, and should reflect both the patterns of the time series (e.g., trends, seasonal patterns, etc.) and the response to independent variables (e.g., how online product sales respond to price or promotions). For example, products that react to independent variables in different ways may result in inaccurate predictions if grouped together when modeling. At blocks 1604, 1606, 1608, clustering can occur to obtain cluster results. Clustering can occur using various techniques. Clustering can involve clustering the time series data based on their patterns and their response to independent variables (e.g., values, discount, and the like). Thus, the series can be aggregated in each cluster without losing signals. In some cases, clustering can be based on known features (e.g., linear or logistic modeling), combinations of known features (e.g., polynomial modeling), or latent features (e.g., factorization machine modeling), although other suitable techniques may be used.

Process 1600 can involve performing one of the techniques described at block 1604, block 1606, or block 1608.

At block 1604, factorization machine clustering can be performed. Factorization machine clustering can comprise using a factorization machine to establish a set of cross weights associated with cross features, then clustering the time series based on the cross weights. The use of a factorization machine effectively permits clustering to occur according to latent features that may not be present in the original dataset, thus focusing clustering on latent features that are optimal for modeling the actual data, rather than focusing on known elements that are easy to collect, present, or otherwise understand.

A factorization machine can be defined according to the equation:

$$\hat{y}(x) := w_0 + \sum_{i=1}^{n} w_i x_i + \sum_{i=1}^{n} \sum_{j=1}^{n} \langle v_i, v_j \rangle x_i x_j$$

where the model parameters that are to be estimated are: $w_0 \in \mathbb{R}$, $w \in \mathbb{R}^n$, $V \in \mathbb{R}^{n \times k}$. The dot product of two vectors of size k can be shown by equation:

$$\langle v_i, v_j \rangle := \sum_{f=1}^{k} v_{i,f} \cdot v_{j,f}$$

The value k can refer to the dimensionality of the factorization. The value for k can be predefined or automatically selected. The value for k can be selected from values between a threshold number and n.

In some cases, performing factorization machine clustering can first involve decomposing timestamped data to extract the trend component at block 1610. This de-trending of the timestamped data can be useful when the data is not stationary.

At block 1612, the factorization machine can be applied using the timestamped data observation as the target (y) and the seasonal index and the set of independent variables as the variables (x). In this fashion, the weight of the cross features $\hat{w}_{i,j} = \langle V_i, V_1 \rangle$ represents the interaction between the variables. Since this interaction is modeled by factorizing, it allows high quality of parameters estimates under sparsity and noise. Unlike regression modeling, the interaction in factorizing is done by dot product, so there is no need to estimate parameters for all different combinations of $V_i$ and $V_1$ value, which is size of n*n. Instead, only n*K parameters are estimated, which is much fewer than n*n parameters, which gives enough freedom to allow for high sparsity data and noise in the data.

After applying the factorization machine at block 1612, the set of weights of the cross features can be extracted from the factorization machine results at block 1614. At block 1616, the timestamped data can be clustered according to the weights of each of the cross features of the factorization machine results. As a result, the timestamped data is now clustered according to latent features, which can be the features desired to be extracted from the time series. One advantage of using a factorization machine is that it can work well with noisy data or data with sparse occurrence of some independent variables values. In some cases, use of a factorization machine may be less desirable for modeling more complex predictor-outcome relationships. Clustering at block 1616 can be based on K-means clustering using the features extracted from the factorization machine.

At block 1606, regression clustering can be performed. Regression clustering can include setting all observations of the time series as dependent variables, taking time index, seasonal dummies, and input independent variables as the predictor variables in the model, and using the coefficient estimates for the model as the extracted features for clustering, which can be based on K-means clustering. Regression clustering can be advantageous because it is flexible to model the relationship in any functional form, including but not limited to linear relationships. In some cases, regression clustering can be less desirable for noisy data, since the noise in each individual time series level might be captured in the model and lead to incorrect and/or unstable estimates.

At block 1608, other clustering techniques can be used to arrange the timestamped data into clusters.

At block 1618, the clustered results from block 1604, block 1606, or block 1608 can be used to select attributes for the recommended hierarchical structure. The attributes (e.g., time-independent attributes) can be selected by setting the cluster results as a target variable and the attributes as an input variable in an appropriate model. In some cases, a tree model (e.g., random forest) can be used to interpret the cluster results through the attributes. When some tree models (e.g., classification tree) are used, attributes having a gini index greater than a threshold (e.g., zero) can be considered significant and therefore can be selected at block 1618. In some cases, information gain for attributes can be calculated and attributes with an information gain greater than a threshold number can be selected at block 1618. Other techniques can be used to interpret the cluster results through the attributes, wherein the attributes selected at block 1618 are those attributes that identified as significant to interpreting the cluster results.

In some cases, regression modeling used to select attributes can be further used to determine an order for the selected attributes. For example, ordering the selected attributes can include determining a Bayesian criteria associated with each of the selected attributes by performing a linear regression using the selected attributes as independent variables; and ordering the selected attributes according to decreasing order of the Bayesian criteria associated with each of the selected attributes.

Figure 17:
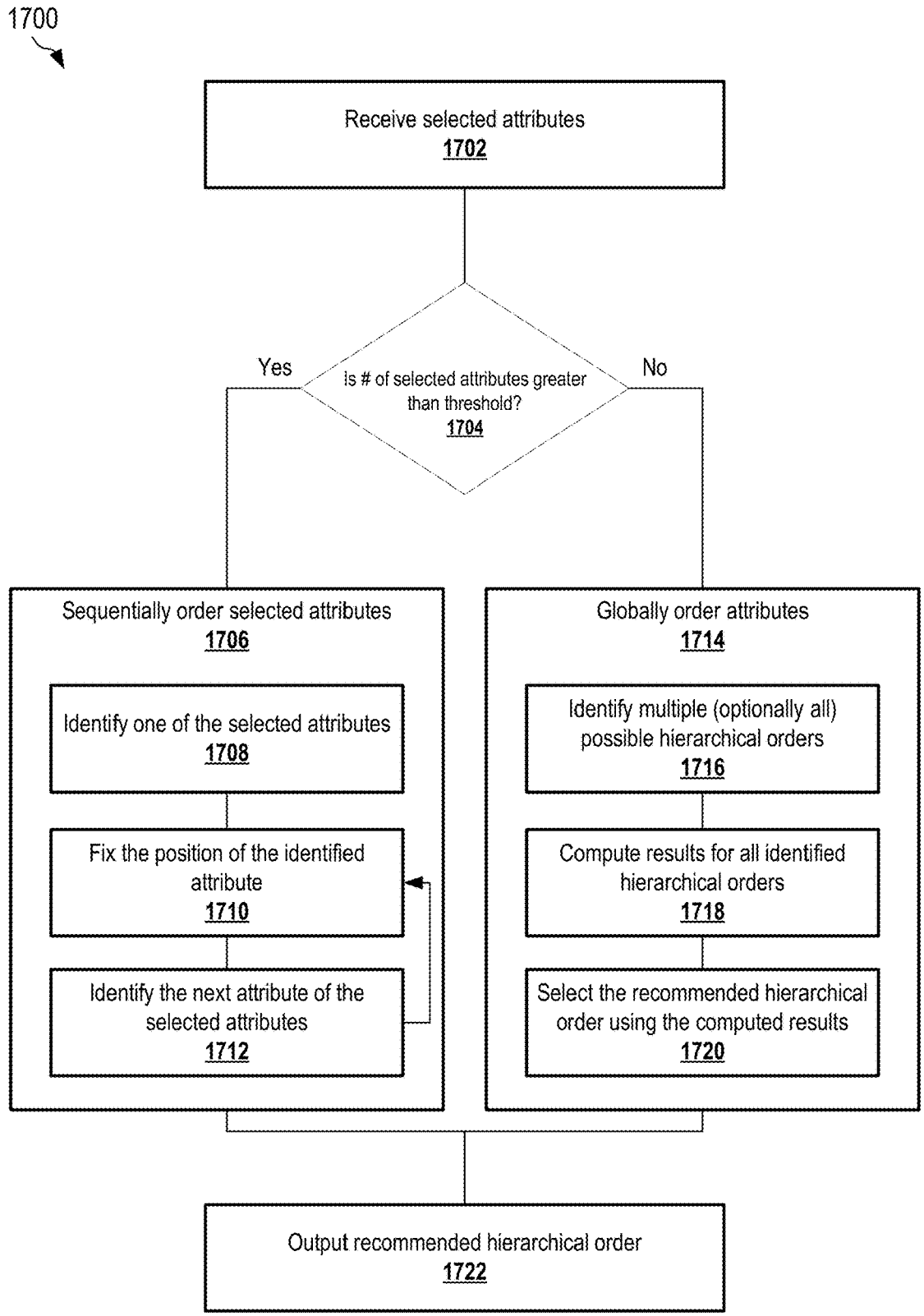
FIG. 17 is a flowchart depicting an example of a process for automatically ordering selected attributes according to certain aspects of the present disclosure.

FIG. 17 is a flowchart depicting an example of a process 1700 for automatically ordering selected attributes according to certain aspects of the present disclosure. Process 1700 can incorporate or be similar to ordering attributes at block 1414 of process 1400 of FIG. 14. At block 1702, selected attributes can be received. In some cases, the selected attributes can be those attributes selected by process 1600 or from block 1408 of FIG. 14.

Process 1700 can include ordering the selected attributes in any suitable technique, such as sequentially ordering the selected attributes at block 1706 or globally ordering the attributes at block 1714. In some cases, the choice of ordering technique can be preset or based on user input. In some cases, however, the choice of ordering technique can be based on an evaluation at block 1704. At block 1704, the number of selected attributes can be evaluated against a threshold number (e.g., an attribute threshold). If the number of selected attributes is greater than the threshold number, the number of selected attributes can be considered large and the ordering of the selected attributes can be conducted using a less computationally expensive and/or faster technique, such as sequential ordering at block 1706. If the number of selected attributes is at or less than the threshold number, the number of selected attributes can be considered small and the ordering of the selected attributes can be conducted using a more accurate—but potentially more computationally expensive and/or slower—technique, such as global ordering at block 1714.

At block 1706, the selected attributes can be sequentially ordered. Sequential ordering can involve progressively building an order of the attributes, one attribute at a time. Sequential ordering can involve identifying one of the selected attributes (e.g., the first attribute or next attribute) at block 1708, then fixing the position of the identified attribute in the order at block 1710. Fixing the position of the identified attribute can include identifying an optimal or desired location of the attribute within the current order, then fixing the attribute at that location. At block 1712, the next attribute of the selected attributes (e.g., next attribute that has not yet been fixed in the order) can be identified, then that next attribute can be fixed at lock 1710 as the process repeats until each of the selected attributes has been fixed in the order. While sequential ordering may be fast and computationally inexpensive, at least as compared to other ordering techniques, sequential ordering may not result in the optimal order of attributes. For example, when fixing the final attribute in position, sequential ordering does not consider whether adjusting any of the already-fixed attributes may result in a better order (e.g., an order that results in more efficient or more accurate forecasts).

At block 1714, the selected attributes can be globally ordered. Global ordering can involve selecting a desired order from a list of some or all different possible orders. Selecting the desired order can involve comparing the performance of some or all different permutations of the selected attributes.

At block 1716, multiple possible hierarchical orders can be identified. In some cases, all possible hierarchical orders can be identified at block 1716. At block 1718, results are computed for all identified hierarchical orders from block 1716. Computing results can include computing actual forecast results, computing approximate results, or computing some other metric associated with the performance of the hierarchical order. At block 1720, a recommended hierarchical order is selected based on the computed results. For example, in the case of computing actual forecast results at block 1718, the computed results can include error values, in which case the recommended hierarchical order can be selected as the hierarchical order having the lowest error value. Other metrics can be used to select a recommended hierarchical order.

At block 1722, the order of attributes (e.g., hierarchical order) from block 1706 or block 1714 can be output as the recommended hierarchical order. In some cases, outputting the recommended hierarchical order can involve adjusting or formatting the output from block 1706 or block 1714 into a format usable by a hierarchical modeling module.

Figure 18:
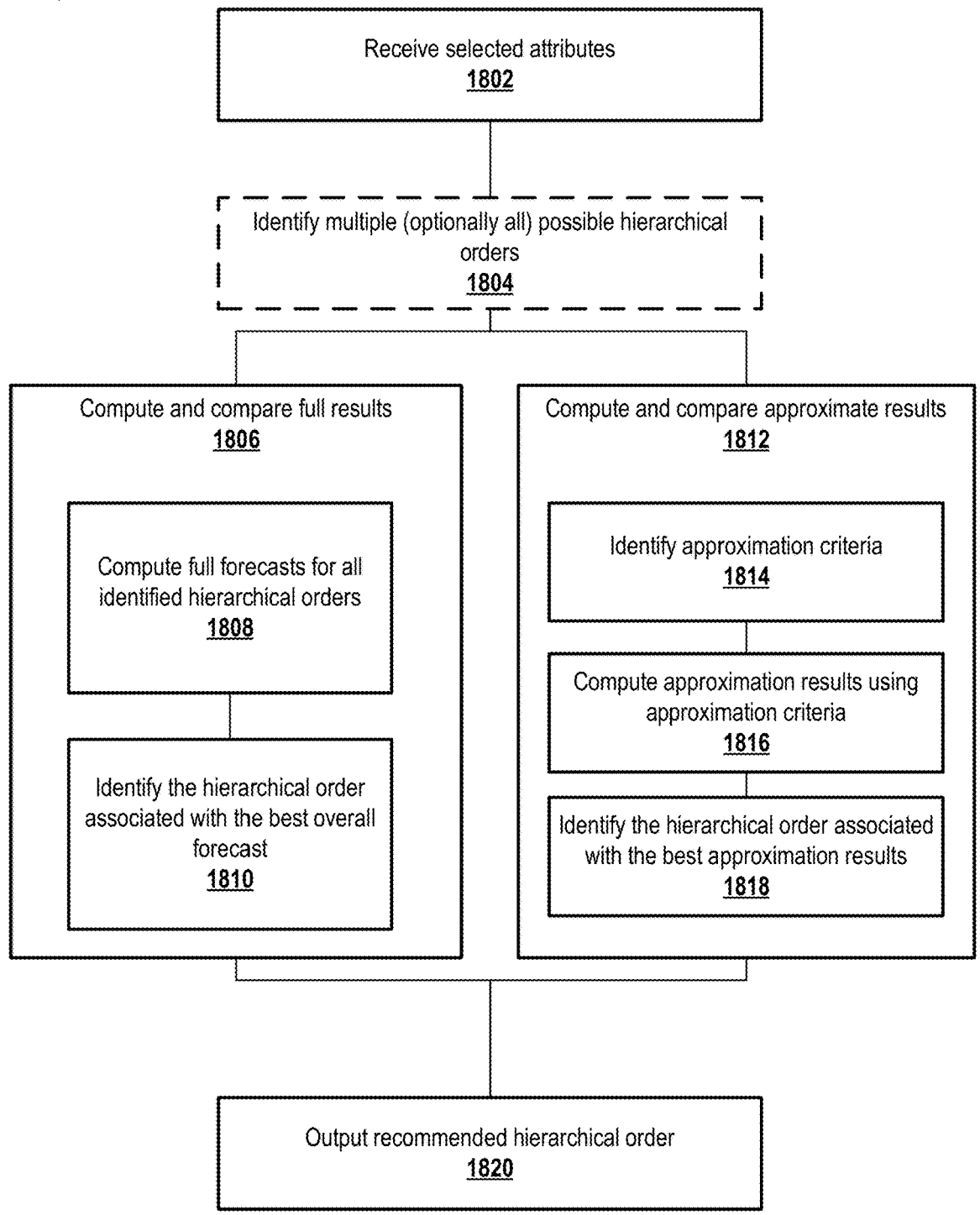
FIG. 18 is a flowchart depicting an example of a process for automatically ordering selected attributes according to certain aspects of the present disclosure.

FIG. 18 is a flowchart depicting an example of a process 1800 for automatically ordering selected attributes according to certain aspects of the present disclosure. Process 1800 can incorporate, be similar to, or replace globally ordering attributes at block 1714 of process 1700 of FIG. 17. In some cases, process 1800 can be used to automatically sequentially order attributes, such as described with reference to block 1706 of process 1700 of FIG. 17. At block 1802, the selected attributes can be received. At optional block 1804, possible hierarchical orders can be identified, such as all hierarchical orders. In some cases, it may not be necessary to identify hierarchical orders, such as if approximation is performed based on known criteria, such as the values of cross weights from factorization machine clustering.

Process 1800 can continue with block 1808 or block 1812. In some cases, the choice of continuing with block 1808 or block 1812 can be based on a user setting.

At block 1806, full results can be computed and compared. At block 1808, full forecasts for all identified hierarchical orders can be computed. At block 1810, the hierarchical order associated with the best overall forecast can be selected. Calculating full results can be computationally expensive, but can result in the best possible results (e.g., most accurate results).

At block 1812, approximate results can be computed and compared. At block 1814, approximation criteria can be identified. Approximation criteria can be any criteria usable to approximate the performance of a hierarchical order against another hierarchical order. Based on different assumptions, there are many different ways to come up with the approximation criteria. For example, based on the assumption that series with similar patterns should be closer in the hierarchy, the attributes can be ordered to achieve the longest between-group distance higher in the hierarchy. Another example is to simply apply a variable selection method on the time series with the selected attributes as the variables, and then order the attributes based on the criteria used in the attribute selection method. At block 1816, approximation results can be computed using the approximation criteria. At block 1818, the hierarchical order associated with the best approximate results can be selected.

At block 1820, the hierarchical order from block 1806 or block 1812, whichever has been performed, can be output as the recommended hierarchical order. In some cases, outputting the recommended hierarchical order can involve adjusting or formatting the output from block 1806 or block 1812 into a format usable by a hierarchical modeling module.

Figure 19:
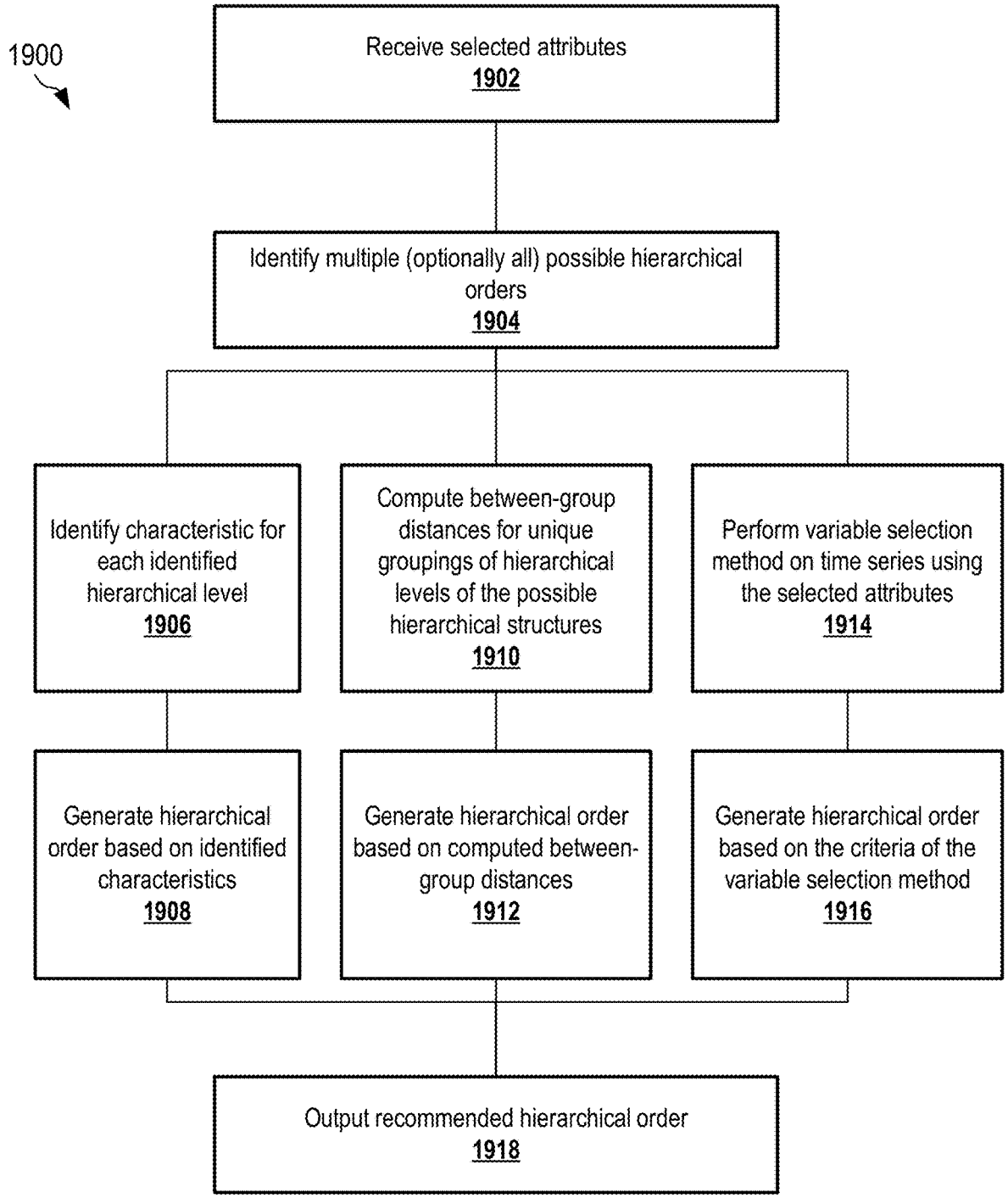
FIG. 19 is a flowchart depicting an example of a process for automatically ordering selected attributes using approximation techniques according to certain aspects of the present disclosure.

FIG. 19 is a flowchart depicting an example of a process 1900 for automatically ordering selected attributes using approximation techniques according to certain aspects of the present disclosure. Process 1900 can incorporate or be similar to globally ordering attributes at block 1714 of process 1700 of FIG. 17. In some cases, process 1900 can be used to automatically sequentially order attributes, such as described with reference to block 1706 of process 1700 of FIG. 17. In some cases, process 1900 can be used to evaluate the results of an order of attributes obtained via blocks 1706, 1714 of process 1700 of FIG. 17. At block 1902, the selected attributes can be received. At block 1904, possible hierarchical orders can be identified, such as all hierarchical orders. After block 1904, one of block 1906, block 1910, or block 1914 can be performed. The choice of block 1906, block 1910, or block 1914 can be based on a user setting.

At block 1906, a characteristic for each identified hierarchical level can be identified. At block 1908, the hierarchical order can be generated based on the identified characteristics.

At block 1910, the between-group distances for unique groupings of the hierarchical levels of the identified multiple possible hierarchical orders can be computed. At block 1912, the hierarchical order can be generated based on the computed between-group distances.

At block 1914, a variable selection method can be performed on the time series using the selected attributes (e.g., as the variables). At block 1916, the hierarchical order can be generated based on the criteria used in the variable selection method of block 1914.

At block 1818, the hierarchical order from block 1908, block 1912, or block 1916 can be output as the recommended hierarchical order. In some cases, outputting the recommended hierarchical order can involve adjusting or formatting the output from block 1908, block 1912, or block 1916, depending on which block is used, into a format usable by a hierarchical modeling module.

FIG. 20 is a chart 2000 comparing error rates associated with a non-hierarchy 2002, a user-provided hierarchy 2004, and an automatically generated hierarchy 2006 when mean absolute percentage error is used as the model selection criteria and auto reconciliation criteria according to certain aspects of the present disclosure. Each unique data row refers to a unique dataset. The mean absolute percentage error (MAPE) and mean squared error (MSE) for the fit (e.g., in-sample data) and forecast (e.g., out-sample data) for the non-hierarchy 2002 and each hierarchy 2004, 2006 is shown for each dataset. The non-hierarchy 2002 refers to a benchmark analysis without the use of a hierarchy. The user-provided hierarchy 2004 refers to a benchmark hierarchy based on a user-provided planning hierarchy, such as a standard hierarchy used by organizations to easily visualize and/or understand the timestamped data. The automatically generated hierarchy 2006 refers to a hierarchy that has been automatically generated according to certain aspects of the present disclosure, such as process 1424 of FIG. 14. The darkened squares identify the highest accuracy (e.g., lowest error) values.

As seen in FIG. 20, the automatically generated hierarchy 2006 achieves the highest accuracy across nearly all datasets in both fit and forecast. In the example of a wind turbine, this higher accuracy can result in a more accurate estimation for failure date of components of the wind turbine. With this more accurate failure date estimation, the wind turbine can be run with confidence longer, until a repair or replacement is needed, and/or maintenance personnel or replacement parts can be prepared closely in advance of an expected failure. With a less accurate failure date estimation, the increase in uncertainty would require repairs or replacements to occur sooner. In some cases, certain hierarchies (e.g., low level hierarchy 2002 or user-provided hierarchy 2004) can achieve a high degree of accuracy in fit, but may in fact be over-fit such that it is unable to accurately forecast out-sample data.

FIG. 21 is a chart 2100 comparing error rates associated with a non-hierarchy, a user-provided hierarchy, and an automatically generated hierarchy when mean squared error is used as the model selection criteria and auto reconciliation criteria according to certain aspects of the present disclosure. Each unique data row refers to a unique dataset. The mean absolute percentage error (MAPE) and mean squared error (MSE) for the fit (e.g., in-sample data) and forecast (e.g., out-sample data) for the non-hierarchy 2102 and each hierarchy 2104, 2106 is shown for each dataset. The non-hierarchy 2102 refers to a benchmark analysis without the use of a hierarchy. The user-provided hierarchy 2104 refers to a benchmark hierarchy based on a user-provided planning hierarchy, such as a standard hierarchy used by organizations to easily visualize and/or understand the timestamped data. The automatically generated hierarchy 2106 refers to a hierarchy that has been automatically generated according to certain aspects of the present disclosure, such as process 1424 of FIG. 14. The darkened squares identify the highest accuracy (e.g., lowest error) values.

As seen in FIG. 21, the automatically generated hierarchy 2106 achieves the highest accuracy across nearly all datasets in both fit and forecast. In the example of a wind turbine, this higher accuracy can result in a more accurate estimation for failure date of components of the wind turbine. With this more accurate failure date estimation, the wind turbine can be run with confidence longer, until a repair or replacement is needed, and/or maintenance personnel or replacement parts can be prepared closely in advance of an expected failure. With a less accurate failure date estimation, the increase in uncertainty would require repairs or replacements to occur sooner. In some cases, certain hierarchies (e.g., low level hierarchy 2102 or user-provided hierarchy 2104) can achieve a high degree of accuracy in fit, but may in fact be over-fit such that it is unable to accurately forecast out-sample data.

Figure 22:
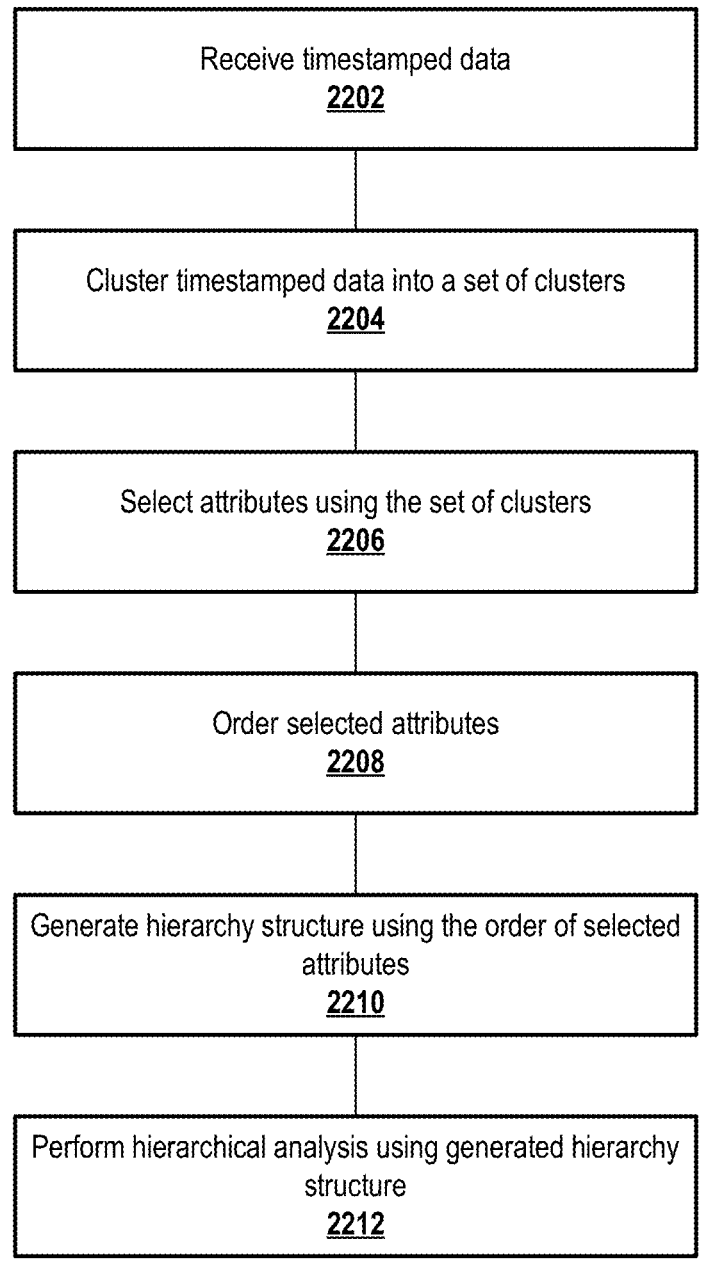
FIG. 22 is a flowchart depicting a process for automatically generating a hierarchy structure and performing hierarchical analysis according to certain aspects of the present disclosure.

FIG. 22 is a flowchart depicting a process 2200 for automatically generating a hierarchy structure and performing hierarchical analysis according to certain aspects of the present disclosure. Process 2200 can be similar to process 1400 of FIG. 14.

At block 2202, timestamped data can be received. The timestamped data can be associated with a set of attributes and a set of independent variables. The set of attributes can comprise one or more time-independent attributes. The set of independent variables can comprise one or more independent variables. Receiving timestamped data at block 2202 can be similar to receiving timestamped data at block 1402 of FIG. 14.

At block 2204, the timestamped data can be clustered into a set of clusters. In some cases, clustering the timestamped data at block 2204 can include generating cluster information associated with the set of clusters. Clustering the timestamped data can include detecting patterns in the timestamped data and/or determining responses of the timestamped data to the set of independent variables. Cluster results (e.g., information associated with clustering the timestamped data into the set of clusters) can be generated based on the patterns of the timestamped data and/or the responses of the timestamped data to the set of independent variables. Clustering the timestamped data at block 2204 can be similar to clustering the time series data at block 1410 of FIG. 14.

At block 2206, attributes from the set of attributes can be selected using the set of clusters (e.g., the cluster results). Selecting the attributes can comprise identifying, from the set of attributes, a subset of attributes that are associated with the clusters. Selecting the attributes at block 2206 can be similar to selecting attributes at block 1412 of FIG. 14.

At block 2208, the attributes selected at block 2206 can be ordered. Ordering the selected attributes can comprise sequentially building an order of the selected attributes or globally building the order of the selected attributes. Sequentially building the order of the selected attributes can comprise sequentially determining a location for a given attribute of the selected attributes in a current arrangement, updating the current arrangement with the location for the given attribute, and determining a location for a next attribute of the selected attributes in the updated current arrangement. Globally building the order of the selected attributes can comprise determining a first order of the selected attributes, determining a second order of the selected attributes, and comparing the first order and the second order to generate the order of the selected attribute. Ordering the selected attributes at block 2208 can be similar to ordering selected attributes at block 1414 of FIG. 14.

At block 2210, a hierarchy structure (e.g., a hierarchical structure) can be generated using the order of the selected attributes. The structure for the hierarchy can define the levels of the hierarchy. The structure of the hierarchy can include two or more levels of the hierarchy, such as three or more levels. Generating the hierarchy structure at block 2210 can be similar to generating the hierarchical structure at block 1416 of FIG. 14.

At block 2212, hierarchical analysis can be performed using the generated hierarchy structure. Performing hierarchical analysis can include generating predicted values across the levels of the hierarchy using the received timestamped data and the generated hierarchical structure, wherein predicted values of one or more levels of the plurality of levels is informed by predicted values of another level of the plurality of levels, such as described with reference to hierarchy 1300 of FIG. 13. Performing the hierarchical analysis at block 2212 can be similar to performing hierarchical analysis at block 1420 of FIG. 14.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system, comprising: one or more data processors; and a non-transitory computer-readable storage medium containing instructions which, when executed on the one or more data processors, cause the one or more data processors to perform operations including: receiving timestamped data, wherein the timestamped data is associated with a set of attributes and a set of independent variables, wherein the set of attributes comprises one or more time-independent attributes, and wherein the set of independent variables comprises one or more independent variables;

clustering the timestamped data into a set of clusters, wherein clustering the timestamped data comprises detecting patterns in the timestamped data, determining responses of the timestamped data to the set of independent variables, and generating cluster results based on the patterns of the timestamped data and the responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises sequentially building an order of the selected attributes or globally building the order of the selected attributes; wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement; and wherein globally building the order of the selected attributes comprises determining a first order of the selected attributes, determining a second order of the selected attributes, and comparing the first order and the second order to generate the order of the selected attribute; generating a structure for a hierarchy using the order of the selected attributes, wherein the structure for the hierarchy defines a plurality of levels of the hierarchy; and generating predicted values across the plurality of levels of the hierarchy using the received timestamped data and the generated hierarchical structure, wherein predicted values of one or more levels of the plurality of levels is informed by predicted values of another level of the plurality of levels.

Example 2 is the system of example(s) 1, wherein the timestamped data is associated with an original hierarchical structure, and wherein the generated structure for the hierarchy is optimized for generating predicted values across the plurality of levels of the hierarchy such that the predicted values, when generated using the generated structure for the hierarchy, are more accurate than hypothetical predicted values generated using the original hierarchical structure.

Example 3 is the system of example(s) 1 or 2, wherein the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes.

Example 4 is the system of example(s) 1-3, wherein comparing the first order with the second order comprises comparing hierarchical analysis results associated with the first order with hierarchical analysis results associated with the second order.

Example 5 is the system of example(s) 1-4, wherein comparing the first order with the second order comprises comparing an approximation measurement of the first order with an approximation measurement of the second order, wherein the approximation measurement of the first order and the approximation measurement of the second order are obtainable without performing hierarchical analysis.

Example 6 is the system of example(s) 1-5, wherein ordering the selected attributes comprises sequentially building the order of the selected attributes.

Example 7 is the system of example(s) 1-6, wherein ordering the selected attributes comprises comparing all permutations of orders of the selected attributes.

Example 8 is the system of example(s) 1-7, wherein ordering the selected attributes further comprises: determining a number of the selected attributes; comparing the number of the selected attributes to a threshold value; sequentially building the order of the selected attributes if the number of the selected attributes exceeds the threshold value; and comparing all permutations of orders of the selected attributes if the number of selected attributes does not exceed the threshold value.

Example 9 is the system of example(s) 1-8, wherein ordering the selected attributes comprises receiving a user selection associated with the set of attributes and ordering the selected attributes using the user selection, wherein the user selection is indicative of a desired order for each of the set of attributes.

Example 10 is the system of example(s) 1-9, wherein determining the first order comprises: determining a Bayesian criteria associated with each of the selected attributes by performing a linear regression using the selected attributes as independent variables; and ordering the selected attributes according to decreasing order of the Bayesian criteria associated with each of the selected attributes.

Example 11 is a computer-implemented method, comprising: receiving timestamped data, wherein the timestamped data is associated with a set of attributes and a set of independent variables, wherein the set of attributes comprises one or more time-independent attributes, and wherein the set of independent variables comprises one or more independent variables; clustering the timestamped data into a set of clusters, wherein clustering the timestamped data comprises detecting patterns in the timestamped data, determining responses of the timestamped data to the set of independent variables, and generating cluster results based on the patterns of the timestamped data and the responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises sequentially building an order of the selected attributes or globally building the order of the selected attributes; wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement; and wherein globally building the order of the selected attributes comprises determining a first order of the selected attributes, determining a second order of the selected attributes, and comparing the first order and the second order to generate the order of the selected attribute; generating a structure for a hierarchy using the order of the selected attributes, wherein the structure for the hierarchy defines a plurality of levels of the hierarchy; and generating predicted values across the plurality of levels of the hierarchy using the received timestamped data and the generated hierarchical structure, wherein predicted values of one or more levels of the plurality of levels is informed by predicted values of another level of the plurality of levels.

Example 12 is the method of example(s) 11, wherein the timestamped data is associated with an original hierarchical structure, and wherein the generated structure for the hierarchy is optimized for generating predicted values across the plurality of levels of the hierarchy such that the predicted values, when generated using the generated structure for the hierarchy, are more accurate than hypothetical predicted values generated using the original hierarchical structure.

Example 13 is the method of example(s) 11 or 12, wherein the method further comprises preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes.

Example 14 is the method of example(s) 11-13, wherein comparing the first order with the second order comprises comparing hierarchical analysis results associated with the first order with hierarchical analysis results associated with the second order.

Example 15 is the method of example(s) 11-14, wherein comparing the first order with the second order comprises comparing an approximation measurement of the first order with an approximation measurement of the second order, wherein the approximation measurement of the first order and the approximation measurement of the second order are obtainable without performing hierarchical analysis.

Example 16 is the method of example(s) 11-15, wherein ordering the selected attributes comprises sequentially building the order of the selected attributes.

Example 17 is the method of example(s) 11-16, wherein ordering the selected attributes comprises comparing all permutations of orders of the selected attributes.

Example 18 is the method of example(s) 11-17, wherein ordering the selected attributes further comprises: determining a number of the selected attributes; comparing the number of the selected attributes to a threshold value; sequentially building the order of the selected attributes if the number of the selected attributes exceeds the threshold value; and comparing all permutations of orders of the selected attributes if the number of selected attributes does not exceed the threshold value.

Example 19 is the method of example(s) 11-18, wherein ordering the selected attributes comprises receiving a user selection associated with the set of attributes and ordering the selected attributes using the user selection, wherein the user selection is indicative of a desired order for each of the set of attributes.

Example 20 is the method of example(s) 11-19, wherein determining the first order comprises: determining a Bayesian criteria associated with each of the selected attributes by performing a linear regression using the selected attributes as independent variables; and ordering the selected attributes according to decreasing order of the Bayesian criteria associated with each of the selected attributes.

Example 21 is a computer-program product tangibly embodied in a non-transitory machine-readable storage medium, including instructions configured to cause a data processing apparatus to perform operations including: receiving timestamped data, wherein the timestamped data is associated with a set of attributes and a set of independent variables, wherein the set of attributes comprises one or more time-independent attributes, and wherein the set of independent variables comprises one or more independent variables; clustering the timestamped data into a set of clusters, wherein clustering the timestamped data comprises detecting patterns in the timestamped data, determining responses of the timestamped data to the set of independent variables, and generating cluster results based on the patterns of the timestamped data and the responses of the timestamped data to the set of independent variables; selecting attributes from the set of attributes using the set of clusters, wherein selecting the attributes comprises identifying, from the set of attributes, a subset of attributes that are associated with the clusters; ordering the selected attributes, wherein ordering the selected attributes comprises sequentially building an order of the selected attributes or globally building the order of the selected attributes; wherein sequentially building the order of the selected attributes comprises sequentially determining a location for a given attribute of the selected attributes in a current arrangement, updating the current arrangement with the location for the given attribute, and determining a location for a next attribute of the selected attributes in the updated current arrangement; and wherein globally building the order of the selected attributes comprises determining a first order of the selected attributes, determining a second order of the selected attributes, and comparing the first order and the second order to generate the order of the selected attribute; generating a structure for a hierarchy using the order of the selected attributes, wherein the structure for the hierarchy defines a plurality of levels of the hierarchy; and generating predicted values across the plurality of levels of the hierarchy using the received timestamped data and the generated hierarchical structure, wherein predicted values of one or more levels of the plurality of levels is informed by predicted values of another level of the plurality of levels.

Example 22 is the computer-program product of example(s) 21, wherein the timestamped data is associated with an original hierarchical structure, and wherein the generated structure for the hierarchy is optimized for generating predicted values across the plurality of levels of the hierarchy such that the predicted values, when generated using the generated structure for the hierarchy, are more accurate than hypothetical predicted values generated using the original hierarchical structure.

Example 23 is the computer-program product of example(s) 21 or 22, wherein the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each of the set of attributes.

Example 24 is the computer-program product of example(s) 21-23, wherein comparing the first order with the second order comprises comparing hierarchical analysis results associated with the first order with hierarchical analysis results associated with the second order.

Example 25 is the computer-program product of example(s) 21-24, wherein comparing the first order with the second order comprises comparing an approximation measurement of the first order with an approximation measurement of the second order, wherein the approximation measurement of the first order and the approximation measurement of the second order are obtainable without performing hierarchical analysis.

Example 26 is the computer-program product of example(s) 21-25, wherein ordering the selected attributes comprises sequentially building the order of the selected attributes.

Example 27 is the computer-program product of example(s) 21-26, wherein ordering the selected attributes comprises comparing all permutations of orders of the selected attributes.

Example 28 is the computer-program product of example(s) 21-27, wherein ordering the selected attributes further comprises: determining a number of the selected attributes; comparing the number of the selected attributes to a threshold value; sequentially building the order of the selected attributes if the number of the selected attributes exceeds the threshold value; and comparing all permutations of orders of the selected attributes if the number of selected attributes does not exceed the threshold value.

Example 29 is the computer-program product of example(s) 21-28, wherein ordering the selected attributes comprises receiving a user selection associated with the set of attributes and ordering the selected attributes using the user selection, wherein the user selection is indicative of a desired order for each of the set of attributes.

Example 30 is the computer-program product of example(s) 21-29, wherein determining the first order comprises: determining a Bayesian criteria associated with each of the selected attributes by performing a linear regression using the selected attributes as independent variables; and ordering the selected attributes according to decreasing order of the Bayesian criteria associated with each of the selected attributes.

Example 31 is a system, comprising: one or more data processors; and a non-transitory computer-readable storage medium containing instructions which, when executed on the one or more data processors, cause the one or more data processors to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; generating cluster results using the weight values for each of the set of cross features, wherein the cluster results are usable to cluster the timestamped data for analyzing the timestamped data; and displaying the clustered timestamped data.

Example 32 is the system of example(s) 31, wherein the operations further comprise determining a hierarchical structure for hierarchical analysis using the clustered timestamped data.

Example 33 is the system of example(s) 31 or 32, wherein the operations further comprise: modeling the clustered timestamped data using a set of features other than the set of cross features; and outputting the set of features used to model the clustered timestamped data as a set of selected features.

Example 34 is the system of example(s) 33, wherein the set of selected features is a subset of the set of attributes of the timestamped data.

Example 35 is the system of example(s) 33 or 34, wherein modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model.

Example 36 is the system of example(s) 35, wherein selecting the set of features comprises identifying attributes of the set of attributes of the timestamped data having a gini index greater than zero.

Example 37 is the system of example(s) 35, wherein selecting the set of features comprises identifying attributes of the set of attributes of the timestamped data having an information gain greater than a threshold number.

Example 38 is the system of example(s) 35-37, wherein the operations further comprise generating an order of the set of selected features, and wherein generating the order comprises sequentially fixing each of the set of selected features into the order.

Example 39 is the system of example(s) 35-37, wherein the operations further comprise selecting an order of the set of selected features, wherein selecting the order comprises: identifying multiple possible orders of the set of selected features; computing results for each of the identified possible orders; and selecting the order based on the computed results for each of the identified possible orders.

Example 40 is the system of example(s) 31-39, wherein the operations further comprise decomposing the timestamped data to extract a trend component prior to clustering the timestamped data.

Example 41 is a computer-implemented method, comprising: one or more data processors; and a non-transitory computer-readable storage medium containing instructions which, when executed on the one or more data processors, cause the one or more data processors to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; generating cluster results using the weight values for each of the set of cross features, wherein the cluster results are usable to cluster the timestamped data for analyzing the timestamped data; and displaying the clustered timestamped data.

Example 42 is the method of example(s) 41, further comprising determining a hierarchical structure for hierarchical analysis using the clustered timestamped data.

Example 43 is the method of example(s) 41 or 42, further comprising: modeling the clustered timestamped data using a set of features other than the set of cross features; and outputting the set of features used to model the clustered timestamped data as a set of selected features.

Example 44 is the method of example(s) 43, wherein the set of selected features is a subset of the set of attributes of the timestamped data.

Example 45 is the method of example(s) 43 or 44, wherein modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model.

Example 46 is the method of example(s) 45, wherein selecting the set of features comprises identifying attributes of the set of attributes of the timestamped data having a gini index greater than zero.

Example 47 is the method of example(s) 45, wherein selecting the set of features comprises identifying attributes of the set of attributes of the timestamped data having an information gain greater than a threshold number.

Example 48 is the method of example(s) 45-47, further comprising generating an order of the set of selected features, and wherein generating the order comprises sequentially fixing each of the set of selected features into the order.

Example 49 is the method of example(s) 45-47, further comprising selecting an order of the set of selected features, wherein selecting the order comprises: identifying multiple possible orders of the set of selected features; computing results for each of the identified possible orders; and selecting the order based on the computed results for each of the identified possible orders.

Example 50 is the method of example(s) 41-49, further comprising decomposing the timestamped data to extract a trend component prior to clustering the timestamped data.

Example 51 is a computer-program product tangibly embodied in a non-transitory machine-readable storage medium, including instructions configured to cause a data processing apparatus to perform operations including: receiving timestamped data, wherein the timestamped data comprises a plurality of observations, wherein the timestamped data is associated with a set of attributes and a set of independent variables, wherein the set of attributes comprises one or more time-independent attributes, and wherein the set of independent variables comprises one or more independent variables; applying a factorization machine to the timestamped data, wherein the factorization machine utilizes variables and targets, wherein applying the factorization machine comprises using the plurality of observations as the targets of the factorization machine and the set of independent variables as the variable of the factorization machine, and wherein applying the factorization machine results in a set of cross features each having a weight value; extracting the weight values for each of the set of cross features; generating cluster results using the weight values for each of the set of cross features, wherein the cluster results are usable to cluster the timestamped data for analyzing the timestamped data; and displaying the clustered timestamped data.

Example 52 is the computer-program product of example(s) 51, wherein the operations further comprise determining a hierarchical structure for hierarchical analysis using the clustered timestamped data.

Example 53 is the computer-program product of example(s) 51 or 52, wherein the operations further comprise: modeling the clustered timestamped data using a set of features other than the set of cross features; and outputting the set of features used to model the clustered timestamped data as a set of selected features.

Example 54 is the computer-program product of example(s) 53, wherein the set of selected features is a subset of the set of attributes of the timestamped data.

Example 55 is the computer-program product of example(s) 53 or 54, wherein modeling the clustered timestamped data using the set of features other than the set of cross features comprises: applying a tree model using the clustered results as a target variable of the tree model and the set of attributes of the timestamped data as an input variable of the tree model; and selecting the set of features from the set of attributes of the timestamped data using results of applying the tree model.

Example 56 is the computer-program product of example(s) 55, wherein selecting the set of features comprises identifying attributes of the set of attributes of the timestamped data having a gini index greater than zero.

Example 57 is the computer-program product of example(s) 55, wherein selecting the set of features comprises identifying attributes of the set of attributes of the timestamped data having an information gain greater than a threshold number.

Example 58 is the computer-program product of example(s) 55-57, wherein the operations further comprise generating an order of the set of selected features, and wherein generating the order comprises sequentially fixing each of the set of selected features into the order.

Example 59 is the computer-program product of example(s) 55-57, wherein the operations further comprise selecting an order of the set of selected features, wherein selecting the order comprises: identifying multiple possible orders of the set of selected features; computing results for each of the identified possible orders; and selecting the order based on the computed results for each of the identified possible orders.

Example 60 is the computer-program product of example(s) 51-59, wherein the operations further comprise decomposing the timestamped data to extract a trend component prior to clustering the timestamped data.

What is claimed is:

1. A system, comprising:
one or more data processors; and
a non-transitory computer-readable storage medium containing instructions which, when executed on the one or more data processors, cause the one or more data processors to perform operations including:
receiving timestamped data, wherein the timestamped data is associated with time-independent attributes and one or more independent variables;
clustering the timestamped data into a set of clusters, wherein clustering the timestamped data comprises:
detecting patterns in the timestamped data,
determining how the timestamped data is influenced by the one or more independent variables, and
generating the set of clusters based on the patterns of the timestamped data and how the timestamped data is influenced by the one or more independent variables;
selecting attributes from among the time-independent attributes based on the set of clusters, wherein the selected attributes are a subset of the time-independent attributes;
ordering the selected attributes, wherein ordering the selected attributes comprises sequentially building an order of the selected attributes or globally building the order of the selected attributes; wherein sequentially building the order of the selected attributes comprises sequentially determining an order position that a given attribute of the selected attributes is to have in a current order of the selected attributes, updating the current order of the selected attributes based on the order position for the given attribute, and determining an order position that a next attribute of the selected attributes is to have in the updated current order; and wherein globally building the order of the selected attributes comprises determining a first order of the selected attributes, determining a second order of the selected attributes, and comparing the first order and the second order to select the first order or the second order;

generating a structure for a hierarchy using the order of the selected attributes, wherein the structure for the hierarchy defines a plurality of levels of the hierarchy; and generating predicted values across the plurality of levels of the hierarchy using the received timestamped data and the generated hierarchical structure, wherein predicted values of one or more levels of the plurality of levels is informed by predicted values of another level of the plurality of levels.

2. The system of claim 1, wherein the timestamped data is associated with an original hierarchical structure, and wherein the generated structure for the hierarchy is optimized for generating predicted values across the plurality of levels of the hierarchy that are more accurate than hypothetical predicted values generated using the original hierarchical structure.

3. The system of claim 1, wherein the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each attribute among the time-independent attributes.

4. The system of claim 1, wherein comparing the first order with the second order comprises comparing hierarchical analysis results associated with the first order with hierarchical analysis results associated with the second order.

5. The system of claim 1, wherein comparing the first order with the second order comprises comparing an approximation measurement of the first order with an approximation measurement of the second order, wherein the approximation measurement of the first order and the approximation measurement of the second order are obtainable without performing hierarchical analysis.

6. The system of claim 1, wherein ordering the selected attributes comprises sequentially building the order of the selected attributes by sequentially positioning each attribute among the selected attributes in a respective order position.

7. The system of claim 1, wherein ordering the selected attributes comprises comparing all permutations of orders of the selected attributes.

8. The system of claim 1, wherein ordering the selected attributes further comprises:
determining a number of the selected attributes;
comparing the number of the selected attributes to a threshold value;
sequentially building the order of the selected attributes if the number of the selected attributes exceeds the threshold value; and
comparing all permutations of orders of the selected attributes if the number of selected attributes does not exceed the threshold value.

9. The system of claim 1, wherein ordering the selected attributes comprises receiving a user selection associated with the time-independent attributes and ordering the selected attributes based on the user selection, wherein the user selection is indicative of a desired order for each attribute among the time-independent attributes.

10. The system of claim 1, wherein determining the first order comprises:
determining a Bayesian criteria associated with each of the selected attributes by performing a linear regression using the selected attributes as independent variables; and
ordering the selected attributes according to decreasing order of the Bayesian criteria associated with each of the selected attributes.

11. The system of claim 1, wherein the timestamped data comprises a plurality of observations, and wherein the non-transitory computer-readable storage medium further comprises instructions that are executable by the one or more data processors for causing the one or more data processors to perform operations including:
applying a factorization machine to the timestamped data by using the plurality of observations as targets for the factorization machine and by using the one or more independent variables as input variables for the factorization machine, wherein applying the factorization machine results in a set of cross features indicating relationships between the input variables and the targets, each cross feature in the set having a weight value;
extracting the weight value for each cross feature in the set of cross features;
generating cluster results using the weight value for each cross feature in the set of cross features, wherein the cluster results are usable to cluster the timestamped data.

12. A computer-implemented method, comprising:
receiving timestamped data, wherein the timestamped data is associated with time-independent attributes and one or more independent variables;
clustering the timestamped data into a set of clusters, wherein clustering the timestamped data comprises:
detecting patterns in the timestamped data,
determining how the timestamped data is influenced by the set of one or more independent variables, and
generating the set of clusters based on the patterns of the timestamped data and how the timestamped data is influenced by the one or more independent variables;
selecting attributes from among the time-independent attributes based on the set of clusters, wherein the selected attributes are a subset of the time-independent attributes;
ordering the selected attributes, wherein ordering the selected attributes comprises sequentially building an order of the selected attributes or globally building the order of the selected attributes; wherein sequentially building the order of the selected attributes comprises sequentially determining an order position that a given attribute of the selected attributes is to have in a current order of the selected attributes, updating the current order of the selected attributes based on the order position for the given attribute, and determining an order position that a next attribute of the selected attributes is to have in the updated current order; and wherein globally building the order of the selected attributes comprises determining a first order of the selected attributes, determining a second order of the selected attributes, and comparing the first order and the second order to select the first order or the second order;

generating a structure for a hierarchy using the order of the selected attributes, wherein the structure for the hierarchy defines a plurality of levels of the hierarchy; and generating predicted values across the plurality of levels of the hierarchy using the received timestamped data and the generated hierarchical structure, wherein predicted values of one or more levels of the plurality of levels is informed by predicted values of another level of the plurality of levels.

13. The method of claim 12, wherein the timestamped data is associated with an original hierarchical structure, and wherein the generated structure for the hierarchy is optimized for generating predicted values across the plurality of levels of the hierarchy that are more accurate than hypothetical predicted values generated using the original hierarchical structure.

14. The method of claim 12, wherein the method further comprises preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each attribute among the time-independent attributes.

15. The method of claim 12, wherein comparing the first order with the second order comprises comparing hierarchical analysis results associated with the first order with hierarchical analysis results associated with the second order.

16. The method of claim 12, wherein comparing the first order with the second order comprises comparing an approximation measurement of the first order with an approximation measurement of the second order, wherein the approximation measurement of the first order and the approximation measurement of the second order are obtainable without performing hierarchical analysis.

17. The method of claim 12, wherein ordering the selected attributes comprises sequentially building the order of the selected attributes by sequentially positioning each attribute among the selected attributes in a respective order position.

18. The method of claim 12, wherein ordering the selected attributes comprises comparing all permutations of orders of the selected attributes.

19. The method of claim 12, wherein ordering the selected attributes further comprises:
determining a number of the selected attributes;
comparing the number of the selected attributes to a threshold value;
sequentially building the order of the selected attributes if the number of the selected attributes exceeds the threshold value; and
comparing all permutations of orders of the selected attributes if the number of selected attributes does not exceed the threshold value.

20. The method of claim 12, wherein ordering the selected attributes comprises receiving a user selection associated with the time-independent attributes and ordering the selected attributes based on the user selection, wherein the user selection is indicative of a desired order for each attribute among the time-independent attributes.

21. The method of claim 12, wherein determining the first order comprises:
determining a Bayesian criteria associated with each of the selected attributes by performing a linear regression using the selected attributes as independent variables; and
ordering the selected attributes according to decreasing order of the Bayesian criteria associated with each of the selected attributes.

22. A computer-program product tangibly embodied in a non-transitory machine-readable storage medium, including instructions configured to cause a data processing apparatus to perform operations including:
receiving timestamped data, wherein the timestamped data is associated with a time-independent attributes and one or more independent variables;
clustering the timestamped data into a set of clusters, wherein clustering the timestamped data comprises:
detecting patterns in the timestamped data,
determining how the timestamped data is influenced by the one or more independent variables, and
generating the set of clusters based on the patterns of the timestamped data and how the timestamped data is influenced by the one or more independent variables;
selecting attributes from among the time-independent attributes based on the set of clusters, wherein the selected attributes are a subset of the time-independent attributes;
ordering the selected attributes, wherein ordering the selected attributes comprises sequentially building an order of the selected attributes or globally building the order of the selected attributes; wherein sequentially building the order of the selected attributes comprises sequentially determining an order position that a given attribute of the selected attributes is to have in a current order of the selected attributes, updating the current order of the selected attributes based on the order position for the given attribute, and determining an order position that a next attribute of the selected attributes is to have in the updated current order; and wherein globally building the order of the selected attributes comprises determining a first order of the selected attributes, determining a second order of the selected attributes, and comparing the first order and the second order to select the first order or the second order;
generating a structure for a hierarchy using the order of the selected attributes, wherein the structure for the hierarchy defines a plurality of levels of the hierarchy; and
generating predicted values across the plurality of levels of the hierarchy using the received timestamped data and the generated hierarchical structure, wherein predicted values of one or more levels of the plurality of levels is informed by predicted values of another level of the plurality of levels.

23. The computer-program product of claim 22, wherein the timestamped data is associated with an original hierarchical structure, and wherein the generated structure for the hierarchy is optimized for generating predicted values across the plurality of levels of the hierarchy that are more accurate than hypothetical predicted values generated using the original hierarchical structure.

24. The computer-program product of claim 22, wherein the operations further comprise preprocessing the timestamped data before clustering the timestamped data, wherein clustering the timestamped data comprises clustering the preprocessed timestamped data, and wherein preprocessing the timestamped data comprises performing stratified sampling on the timestamped data to reduce a number of records of the timestamped data while maintaining a representative set of records for each attribute among the time-independent attributes.

25. The computer-program product of claim 22, wherein comparing the first order with the second order comprises comparing hierarchical analysis results associated with the first order with hierarchical analysis results associated with the second order.

26. The computer-program product of claim 22, wherein comparing the first order with the second order comprises comparing an approximation measurement of the first order with an approximation measurement of the second order, wherein the approximation measurement of the first order and the approximation measurement of the second order are obtainable without performing hierarchical analysis.

27. The computer-program product of claim 22, wherein ordering the selected attributes comprises sequentially building the order of the selected attributes by sequentially positioning each attribute among the selected attributes in a respective order position.

28. The computer-program product of claim 22, wherein ordering the selected attributes comprises comparing all permutations of orders of the selected attributes.

29. The computer-program product of claim 22, wherein ordering the selected attributes further comprises:
determining a number of the selected attributes;
comparing the number of the selected attributes to a threshold value;
sequentially building the order of the selected attributes if the number of the selected attributes exceeds the threshold value; and
comparing all permutations of orders of the selected attributes if the number of selected attributes does not exceed the threshold value.

30. The computer-program product of claim 22, wherein ordering the selected attributes comprises receiving a user selection associated with the time-independent attributes and ordering the selected attributes based on the user selection, wherein the user selection is indicative of a desired order for each attribute among the time-independent attributes.

* * * * *